United States Patent [19]
Hirase et al.

[11] Patent Number: 5,558,293
[45] Date of Patent: Sep. 24, 1996

[54] RETRACTOR FOR SEAT BELT

[75] Inventors: Satoshi Hirase; Masuo Matsuki, both of Kanagawa, Japan

[73] Assignee: NSK Ltd., Tokyo, Japan

[21] Appl. No.: 425,495

[22] Filed: Apr. 20, 1995

[30]  Foreign Application Priority Data

Apr. 21, 1994  [JP]  Japan .................................. 6-106117
Feb. 27, 1995  [JP]  Japan .................................. 7-061524

[51] Int. Cl.⁶ ................................................ B60R 22/44
[52] U.S. Cl. .................................................... 242/372
[58] Field of Search ................................ 242/372, 375.1, 242/375.3; 280/807; 297/475, 476, 477, 478

[56]          References Cited

U.S. PATENT DOCUMENTS 4,026,494   5/1977   Tanaka .
4,113,200   9/1978   Tanaka .

FOREIGN PATENT DOCUMENTS 55-14661   4/1980   Japan .
55-39349  10/1980   Japan .
56-41257   9/1981   Japan .
60-36972   8/1985   Japan .
1-141147   6/1989   Japan .

*Primary Examiner*—John M. Jillions
*Attorney, Agent, or Firm*—Sughrue, Mion, Zinn, Macpeak & Seas

[57]            ABSTRACT

A retractor for a seat belt includes a winding force reducing mechanism for reducing a webbing winding force when an occupant wears the seat belt. The retractor includes a base; a winding shaft supported rotatably on base for winding a webbing; a first winding spring for energizing the winding shaft in a webbing winding direction; a second winding spring disposed on the winding shaft in parallel to said first winding spring; and gear unit interposed between the winding shaft and the second winding spring for applying the energizing force of the second winding spring to the winding shaft in the same direction as the energizing force of the first winding spring and for tightening the second winding spring in an elastic energy storing direction by means of the energizing force of the first winding spring. The gear unit is structured such that, when the seat belt is in use, the elastic energy of the second winding spring stored therein can act in a manner to cancel the energizing force of the first winding spring so that a reduced energizing force in the webbing winding direction can be applied to the winding shaft.

16 Claims, 15 Drawing Sheets

5,558,293

1

RETRACTOR FOR SEAT BELT

BACKGROUND OF THE INVENTION

The present invention relates to a retractor (a winding device) for a seat belt and, in particular, to an improved retractor for a seat belt including a winding force reducing mechanism which reduces a webbing winding force when a seat belt is in use.

Conventionally, a seat belt device for holding an occupant such as a driver and a passenger in a vehicle safely in the seat comprises a webbing, a buckle, a mounting tool, a retractor and the like.

The retractor is a winding device which, when a seat belt is not in use, automatically draws a webbing and, when the seat belt is in use, can change the length of the webbing freely. In such a retractor, in general, the webbing is drawn out against the winding force of a winding spring thereby tightening the winding spring, while the webbing is drawn in by means of the winding force of the winding spring.

However, since the winding spring is tightened by of the draw-out the webbing, the winding force is normally increased as the webbing is drawn out. Therefore, in a seat belt device of a type that a webbing is drawn out from an ordinary winding device and is put on an occupant, when the occupant wears the seat belt, the webbing winding force becomes strong so that the force, due to the tension of the webbing, on the occupant is increased, which makes the occupant feel disagreeable. In particular, in a seat belt device of a type that a lap belt and a shoulder belt are used as a continuous webbing and a retractor is provided on the shoulder belt side, the webbing winding amount of the retractor increases. For this reason, if the webbing winding force of a winding spring is set such that it can provide a suitable value when restraining the occupant, then the webbing winding force becomes insufficient when the seat belt is stored, whereas, if the webbing winding force is set such that it can provide a sufficient value when the seat belt is stored, then the occupant restraining force of the webbing becomes too strong when the occupant wears the seat belt.

Thus, to solve the above problems, for example, as shown in Japanese Patent Publication No. Sho. 55-14661, there is proposed a seat belt winding device which comprises first and second winding springs respectively interposed between a base and a winding shaft for applying winding spring forces to the winding shaft in accordance with the draw-out of a seat belt, and control means for switching the connecting conditions of the first and second winding springs to select the winding spring force to be applied to the winding shaft to thereby apply a small winding spring force to the winding shaft when the occupant wears the seat belt.

That is, the seat belt winding device includes a winding force reducing mechanism in which the first and second winding springs are connected in series with each other, with the second winding spring having a stronger winding force than the first winding spring, and the control means switches the connecting conditions of the first and second winding springs with respect to the main body of the device and seat belt in such a manner that, during the storage of the seat belt, the control means applies the strong spring force of the second winding spring to the seat belt, while when the occupant wears the seat belt, it applies only the weak force of the first winding spring to the seat belt, thereby reducing the seat belt tensile force so as to reduce the sense of pressure applied to the occupant.

2

Also, according to a seat belt winding device which is disclosed in Japanese Patent Publication No. Sho. 55-39349, first and second winding springs are provided in such a manner that they are meshable and operable with each other through gears, a ratchet gear is provided on the second winding spring, a hook is provided on the ratchet gear which is energized such that it allows the rotation of a webbing in the draw-out direction thereof but prevents the rotation of the webbing in the winding or draw-in direction thereof, and the hook is engaged with the ratchet gear by a clutch mechanism in the webbing using portion, whereby, when the webbing is rotated in the draw-in direction thereof, the tightening of the second winding spring is increased through the gears by the rewinding force of the first winding spring to thereby act so as to cancel the rewinding force of the first winding spring, so that the sense of pressure to be given to the occupant can be reduced.

Further, as disclosed in Japanese Patent Unexamined Publication No. Hei. 1-141147, there is further proposed a seat belt winding device which includes a winding shaft for taking up a seat belt and winding springs for energizing the winding shaft in a webbing winding direction. In particular, the winding springs include a main spring for energizing the winding shaft constantly in the winding direction and an additional spring for applying its energizing force in the winding direction to the winding shaft in such a manner that the energizing force can be interrupted by interrupting means (clutch means), while the main and additional springs are arranged in parallel to each other.

In other words, the last-mentioned seat belt winding device includes a winding force reducing mechanism which, in the normal webbing winding operation, holds a sufficient winding force by means of the combined energizing force of the main and additional springs, and, when the occupant wears the seat belt, fits the seat belt to the body of the occupant only by means of the energizing force of the main spring, thereby being able to reduce the webbing winding force while the seat belt is placed on the occupant, so that an unnecessary sense of pressure is not given to the occupant.

However, in the seat belt winding device disclosed in the above-mentioned Japanese Patent Publication No. Sho. 55-39349, the clutch mechanism is operated only when the winding shaft is rotated in the webbing winding direction while the seat belt is placed on the occupant, and the second winding spring is tightened due to the rewinding force of the first winding spring and acts in such a manner that it cancels the rewinding force of the first winding spring. For this reason, when the seat belt is stored, the webbing winding force must be given only by means of the rewinding force of the first winding spring. This makes it difficult to reduce the size of the first winding spring and to miniaturize the retractor.

Also, in the seat belt winding device disclosed in the above-mentioned Japanese Patent Unexamined Publication No. Hei. 1-141147, the webbing winding force during seat belt storage is obtained by means of the combined energizing force of the two parallel arranged winding springs in the webbing winding direction and, when the occupant wears the seat belt, by interrupting the energizing force of the additional spring by use of the interrupting means, only the energizing force of the main spring can act as the webbing winding force. In this structure, if the energizing force of the main spring is set smaller than the energizing force of the additional spring in order to reduce the sense of pressure to be given to the occupant when the occupant wears the seat belt, then the energizing force of the additional spring becomes relatively large, which results in poor durability of the structure.

Further, in the seat belt winding device disclosed in the above-mentioned Japanese Patent Publication No. Sho. 55-14661 in which the first and second winding springs are connected in series with each other, since the winding torque of the first winding spring is smaller than the winding torque of the second winding spring, when the winding force reducing mechanism is removed by switching over the control means, then the first winding spring is suddenly tightened by the winding torque of the second winding spring and is thus quickly tightened to the full extent and, at the same time, when the seat belt is stored, the first winding spring is always tightened to the full extent. For this reason, if the winding force reducing mechanism is removed, then an excessive stress is applied to the first winding spring having a smaller winding torque, resulting in the poor durability of the first winding spring. That is, in order to enhance the durability thereof, the structure including the winding springs must be designed very carefully.

SUMMARY OF THE INVENTION

The present invention has been made to eliminate the above-described drawbacks found in the conventional seat belt winding devices. Accordingly, it is an object of the invention to provide a retractor for a seat belt which includes a winding force reducing mechanism structured such that it not only can reduce the sense of pressure of a webbing acting on an occupant when the occupant wears a seat belt but also can apply a sufficient winding force to the webbing after the seat belt is removed from the occupant, and also which is able to reduce the size of winding springs and is able to improve the durability thereof.

According to the present invention, there is provided a retractor for a seat belt including a winding force reducing mechanism for reducing a webbing winding force when an occupant wears the seat belt, which includes a base; a winding shaft supported rotatably on the base for winding a webbing; a first winding spring for energizing the winding shaft in a webbing winding direction; a second winding spring disposed on the winding shaft in parallel to said first winding spring; and gear means interposed between the winding shaft and the second winding spring for applying the energizing force of the second winding spring to the winding shaft in the same direction as the energizing force of the first winding spring and for tightening the second winding spring in an elastic energy storing direction by means of the energizing force of the first winding spring. The gear means is structured such that, when the seat belt is in use, the elastic energy of the second winding spring stored therein can act in a manner to cancel the energizing force of the first winding spring so that a reduced energizing force in the webbing winding direction can be applied to the winding shaft.

According to the above structure of the invention, when the seat belt is stored, since the energizing force of the second winding spring is applied to the winding shaft by the gear means in the same direction as the energizing force of the first winding spring, a sufficient energizing force in a webbing winding direction consisting of the combined energizing forces of the first and second winding springs can be applied to the winding shaft. Also, when the occupant wears the seat belt, the second winding spring is tightened by the gear means in the elastic energy storing direction due to the energizing force of the first winding spring and, therefore, the stored elastic energy of the second winding spring can cancel the energizing force of the first winding spring and the thus reduced energizing force in the webbing winding direction can be applied to the winding shaft.

Accordingly, since the energizing forces of the first and second winding springs respectively can act effectively not only when the seat belt is worn by the occupant but also during the storage of the seat belt, loads to be applied to the respective winding springs can be reduced as well as stresses to be applied to them can also be decreased, which makes it possible to reduce the sizes of the respective winding springs as well as to improve the durability thereof.

Further, by using the gear means such as a planetary gear device or the like having a deceleration function, the rotation of a drive part (internal gear) connected to the second winding spring as operatable as to cancel the energizing force of the first winding spring during the seat belt wearing time can be decelerated with respect to the rotation of a drive part (sun gear) connected to the first winding spring, thereby being able to prevent the energizing force of the second winding spring from varying greatly due to the winding amounts of the webbing to be wound after the operation of the winding force reducing mechanism.

Further, when the mutually opposing and pressable surfaces of engaging projections respectively provided in the planetary and inner gears are arranged almost perpendicular to the peripheral direction of the internal gear, the planetary gear cannot be pressed in the radial direction due to a compression force acting between the respective opposing surfaces to thereby mesh with the sun and internal gears.

Further, since the respective opposing surfaces of the engaging projections of the planetary and internal gears are structured such that they oppose each other and can be engaged with each other outside of the tip pitch circle of the planetary gear, the diameter of the shaft hole of the planetary gear can be increased and the sizes of the engaging projections themselves can be increased.

DETAILED DESCRIPTION OF THE PREFERRED EMBODIMENTS

Figure 1:
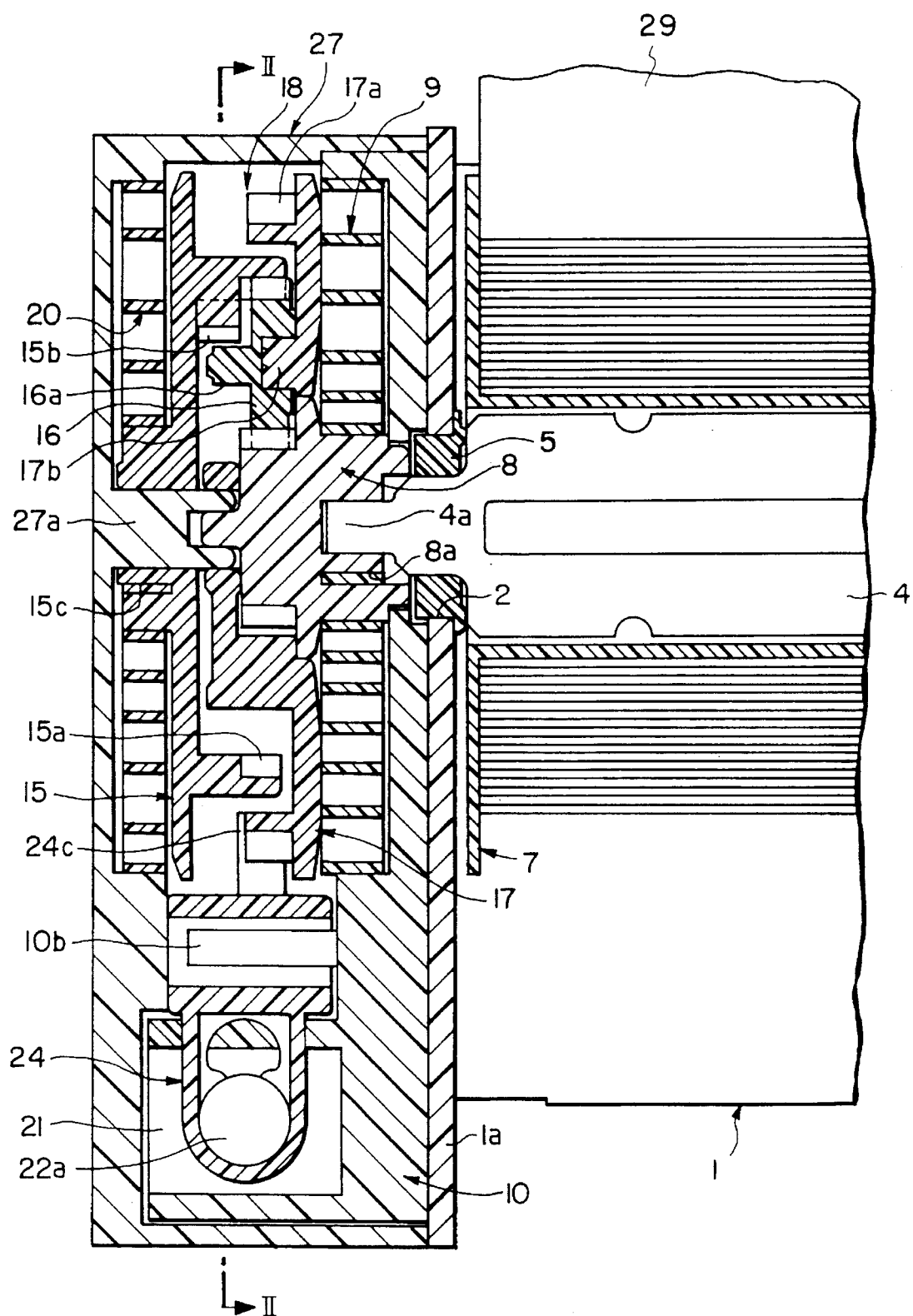
FIG. 1 is a partly sectional front view of a first embodiment of a retractor for a seat belt according to the invention.

Now, preferred embodiments of a retractor for a seat belt according to the present invention will be described with reference to the accompanying drawings.

FIGS. 1 to 4 illustrate a first embodiment of a retractor for a seat belt according to the invention. This retractor comprises a base 1 most of which has a U-shaped section, a pair of plastic bushings 5 which can be respectively fitted into through holes 2 respectively formed in the two side plates 1a of the base 1, a winding reel 7 which enters the base 1 on the same axis as the plastic bushings 5, a first winding spring 9 for energizing a winding shaft 4 extending through these components in a webbing winding direction, a second winding spring 20 arranged on the winding shaft 4 in parallel with the first winding spring 9, a planetary gear device 18 serving as gear means interposed between the first winding shaft 4 and the second winding spring 20 in such a manner that it can apply the energizing force of the second winding spring 20 to the winding shaft 4 in the same direction as the energizing force of the first winding spring 9 and also it can use the energizing force of the first winding spring 9 to energize the second winding spring 20 in an elastic energy storing direction, and a lower cover 10 and an upper cover 27 respectively fixed to the outsides of the two side plates 1a of the base 1 for covering the first and second winding springs 9, 20 and the planetary gear device 18. Thus, the present retractor includes a webbing winding mechanism for energizing a webbing 29 in the winding direction and also a winding force reducing mechanism for reducing a webbing winding force when an occupant wears a seat belt.

One end of the webbing 29 is connected to the winding reel 7 in such a manner that it can be wound around the winding reel 7, while the other end of the webbing 29 is mounted to a proper portion of a vehicle. In the other end portion (not shown) of the winding shaft 4, there is disposed a well known emergency lock mechanism (not shown) which is used to prevent the webbing from being drawn out in an emergency.

Figure 4:
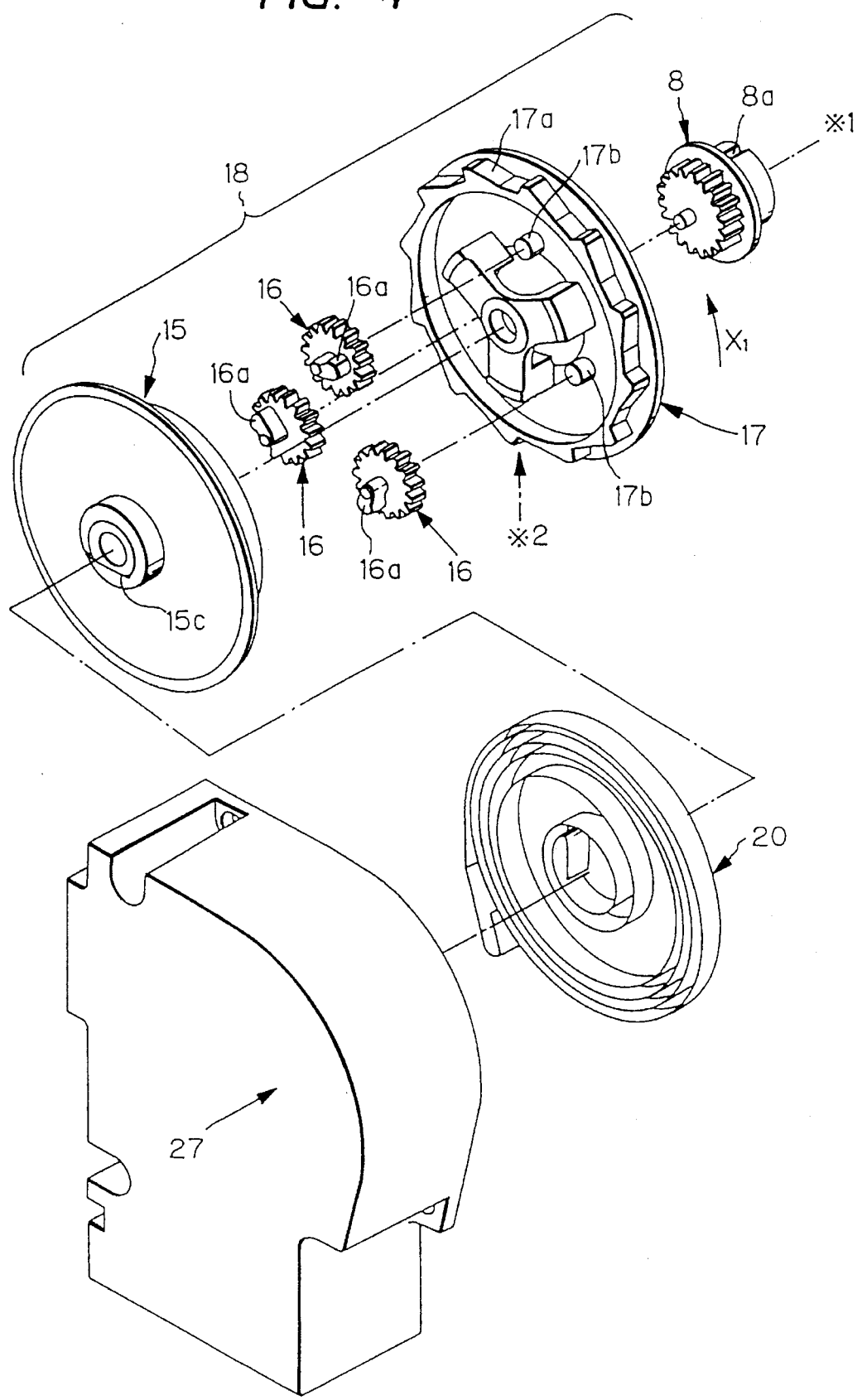
FIG. 4 is an exploded perspective view of the remaining part of the main portions of the retractor for a seat belt shown in FIG. 3.

As shown in FIG. 4, the planetary gear device 18, which forms the winding force reducing mechanism according to the invention, includes a main gear 8 in the form of a sun gear which can be fitted into a rectangular portion 4a formed in one end portion of the winding shaft 4 and can be rotated integrally with the winding shaft 4, a ratchet wheel 17 serving as a carrier member which includes ratchet teeth 17a in the outer peripheral portion thereof and is rotatably supported by a support shaft 27a projectingly provided on the inner wall surface of the upper cover 27, a plurality of planetary gears 16 respectively supported rotatably on support shafts 17b of the ratchet wheel 17 and meshable with the main gear 8, and a disk-shaped retainer 15 of an internal gear which is rotatably supported on the support shaft 27a of the upper cover 27, includes internal teeth respectively meshable with the planetary gears 16 and is rotatable on the same axis as the main gear 8.

One end portion of the first winding spring 9, with the other end portion thereof secured to the securing portion 10a of the lower cover 10, is held in a securing groove 8a formed in the main gear 8 and energizes the winding reel 7 in a webbing winding direction (in FIG. 2, in a direction of an arrow $X_1$) through the main gear 8 and winding shaft 4. Also, one end portion of the second winding spring 20, with the other end portion thereof secured to the securing portion of the upper cover 27, is held in a securing groove 15c formed in the retainer 15 and the second winding spring 20 energizes the retainer 15 in the arrow $X_1$ direction.

Figure 2:
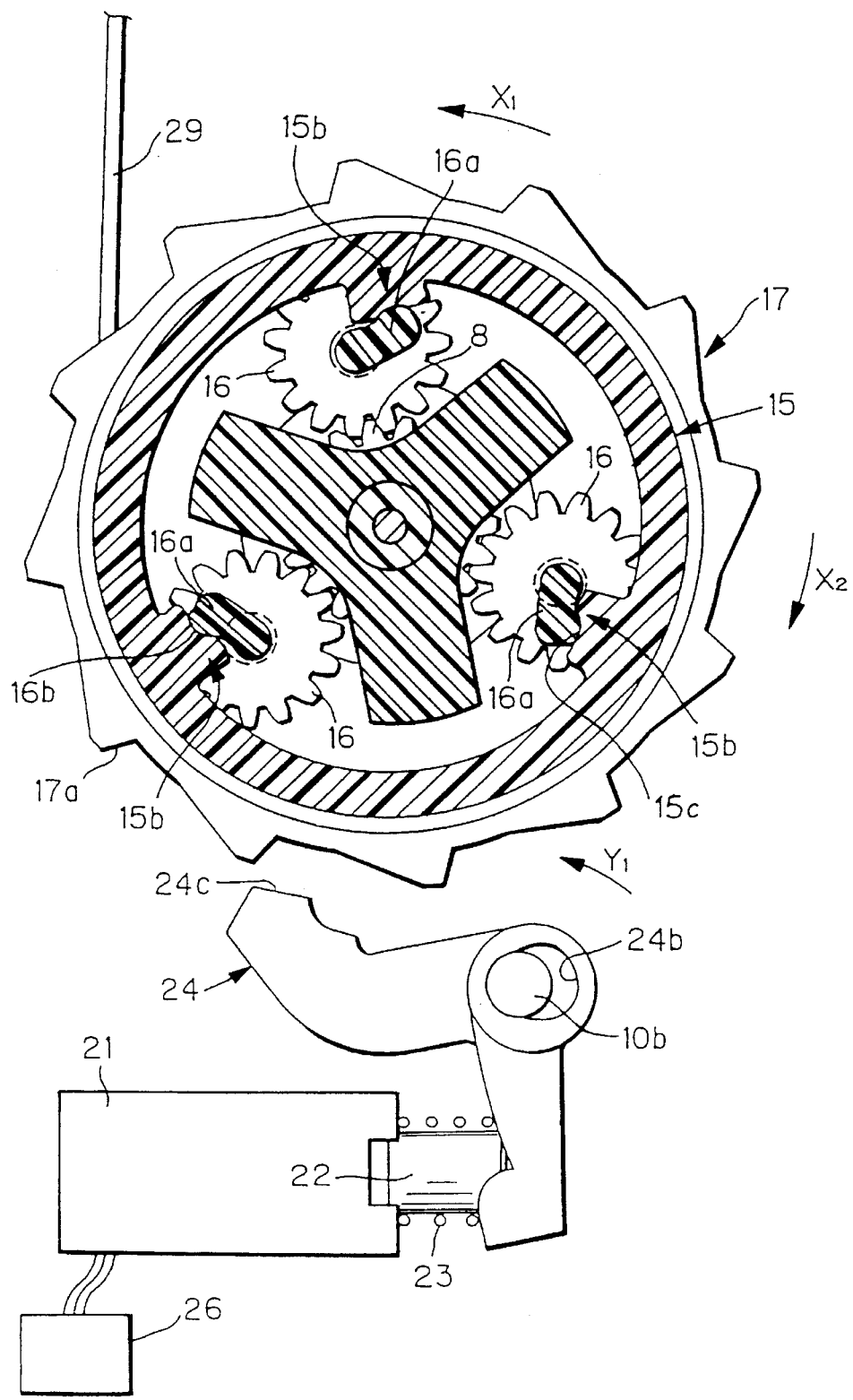
FIG. 2 is a schematic sectional view of the retractor for a seat belt, taken along the line II—II shown in FIG. 1.
Figure 5:
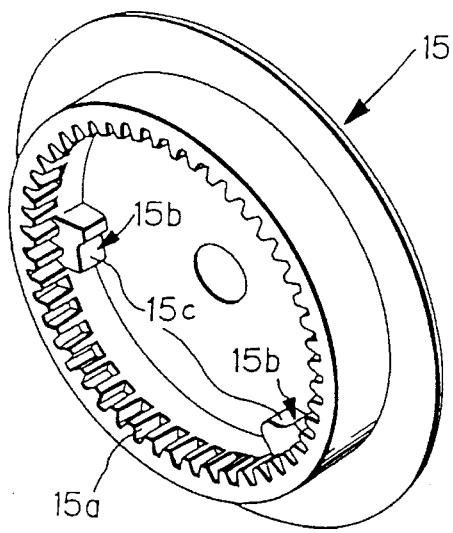
FIG. 5 is a perspective view of the whole of a retainer shown in FIG. 4.

As shown in FIG. 5, the retainer includes engaging projections 15b formed inwardly of the internal teeth 15a and, as shown in FIG. 2, if the engaging projections 15b are engaged with engaging projections 16a formed on the side surface of the planetary gears 16 opposed to the bottom surface of the retainer 15, then there is provided stopper means which restricts the rotation of the planetary gears 16 in a counterclockwise direction as well as the relative movement of the planetary gears 16 with respect to the retainer 15. The engaging projections 16a of the planetary gears 16 are provided on the side surface of the planetary gears 16 in such a manner that they are accommodated within the tip pitch circle of the planetary gears 16. The side surfaces 16b of the engaging projections 16a, which are situated forwardly of the rotation direction of the planetary gears 16 rotating counterclockwise in FIG. 2 on their own axes, are pressed against the opposing surfaces 15c of the engaging projections 15b of the retainer 15 in a manner to oppose the radial direction of the retainer 15.

To operate the winding force reducing mechanism, there is provided a connection detect part 26 which is used to detect the normal connection between a tongue plate and a buckle respectively mounted to a seat belt (not shown). In particular, the connection detect part 26 is composed of a well known detect circuit which, when the tongue plate and buckle respectively mounted to the seat belt (not shown) are in their normal connection with each other, detects such normal connection. For example, the detect circuit can be arranged such that, when the tongue plate is inserted into the buckle normally, a switch previously provided in the buckle outputs a detect signal.

Figure 3:
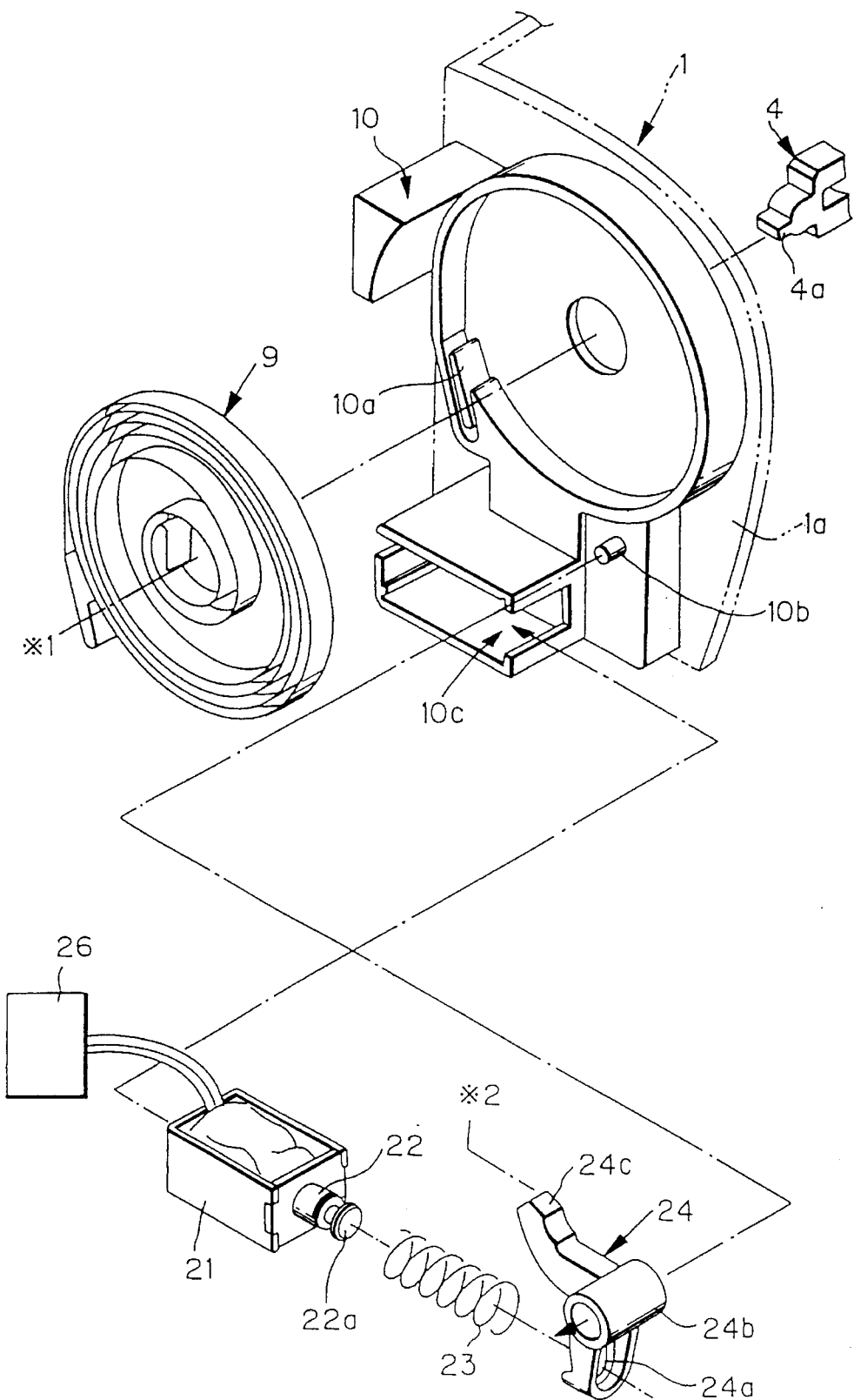
FIG. 3 is a part of an exploded perspective view of the main portions of the retractor for a seat belt shown in FIG. 1.

Also, switching means, which prevents the rotation of the ratchet wheel 17 in accordance with the detect signal of the connection detect part 26 and allows the relative rotation of the retainer 15 in the opposite direction with respect to the main gear 8, includes, as shown in FIG. 3, an electromagnetic solenoid 21 to be fixed to the interior of the hold portion 10c of the lower cover 10, a coil spring 23 to be fitted into a plunger portion 22 of the electromagnetic solenoid 21, a lock arm 24 including an engaging hole 24a to be inserted into the plunger leading end portion 22a of the electromagnetic solenoid 21, and a support shaft 10b provided projectingly on the outer surface of the lower cover 10 and insertable through an engaging boss hole 24b formed in the lock arm 24.

Next, the operation of the above-mentioned winding force reducing mechanism will be described.

At first, a state in which an occupant gets into a vehicle but does not wear the seat belt yet will be described. In this state, the webbing winding mechanism has completed the winding of the webbing 29 and stands still in such a condition as shown in FIG. 2.

In this state, the tongue plate is not yet inserted into the buckle, the detect signal is not yet output from the connection detect part 26, and the electromagnetic solenoid 21 is not excited yet. Therefore, the lock arm 24 of the switching means, as shown in FIG. 2, is rotatively energized in a counterclockwise direction (in a direction of an arrow $Y_1$ in FIG. 2) about the support shaft 10b by means of the spring force of a coil spring 23, so that the leading end engaging portion 24c of the lock arm 24 is put into a state in which it is not engaged with the ratchet teeth 17a of the ratchet wheel 17.

Here, although the main gear 8 is energized in the arrow $X_1$ direction by the first winding spring 9, since the webbing 29 is wound to the full extent, the main gear 8 cannot be rotated any further. Also, similarly, although the retainer 15 is energized in the arrow $X_1$ direction by the second winding spring 20, in a state shown in FIG. 2, since the engaging projections 16a of the planetary gears 16 in mesh with both the main gear 8 and retainer 15 are pressed against the engaging projections 15b of the retainer 15, the retainer 15 is prevented from moving in the arrow $X_1$ direction with respect to the planetary gears 16. Here, since the planetary gears 16 are in mesh with the main gear 8 as well, the retainer 15 is also prevented from rotating in the arrow $X_1$ direction with respect to the main gear 8 and stands still in such a state as shown in FIG. 2.

In this state, if the webbing 29 is drawn out, then the main gear 8 and the winding shaft 4 are rotated in a webbing draw-out direction (in FIG. 2, in a direction of an arrow $X_2$). In this case, since the retainer 15 is prevented from rotating in the arrow $X_1$ direction with respect to the main gear 8, the retainer 15 is connected together with the main gear 8 and planetary gears 16 directly to the winding shaft 4 and is thus rotated in the arrow $X_2$ direction without being decelerated. As a result of this, the combined energizing force consisting of the spring energizing force $F_1$ of the first winding spring 9 with the spring energizing force $F_2$ of the second winding spring 20 is applied to the winding shaft 4 as a webbing winding force F. That is, if the occupant releases the webbing 29, then the webbing 29 can be wound well by a sufficient winding torque given from the first and second winding springs 9, 20.

Next, while the occupant wears the seat belt, after the webbing 29 is drawn out a proper amount from the retractor, if the tongue plate and buckle of the seat belt device are connected to each other and a detect signal is output from the connection detect part 26, then the electromagnetic solenoid 21 is excited and the lock arm 24 of the switching means is rotated clockwise about the support shaft 10b against the spring force of the coil spring 23, so that leading end engaging portion 24c of the lock arm 24 gets into its locking condition in which it meshes with the ratchet teeth 17a of the ratchet wheel 17.

Figure 6:
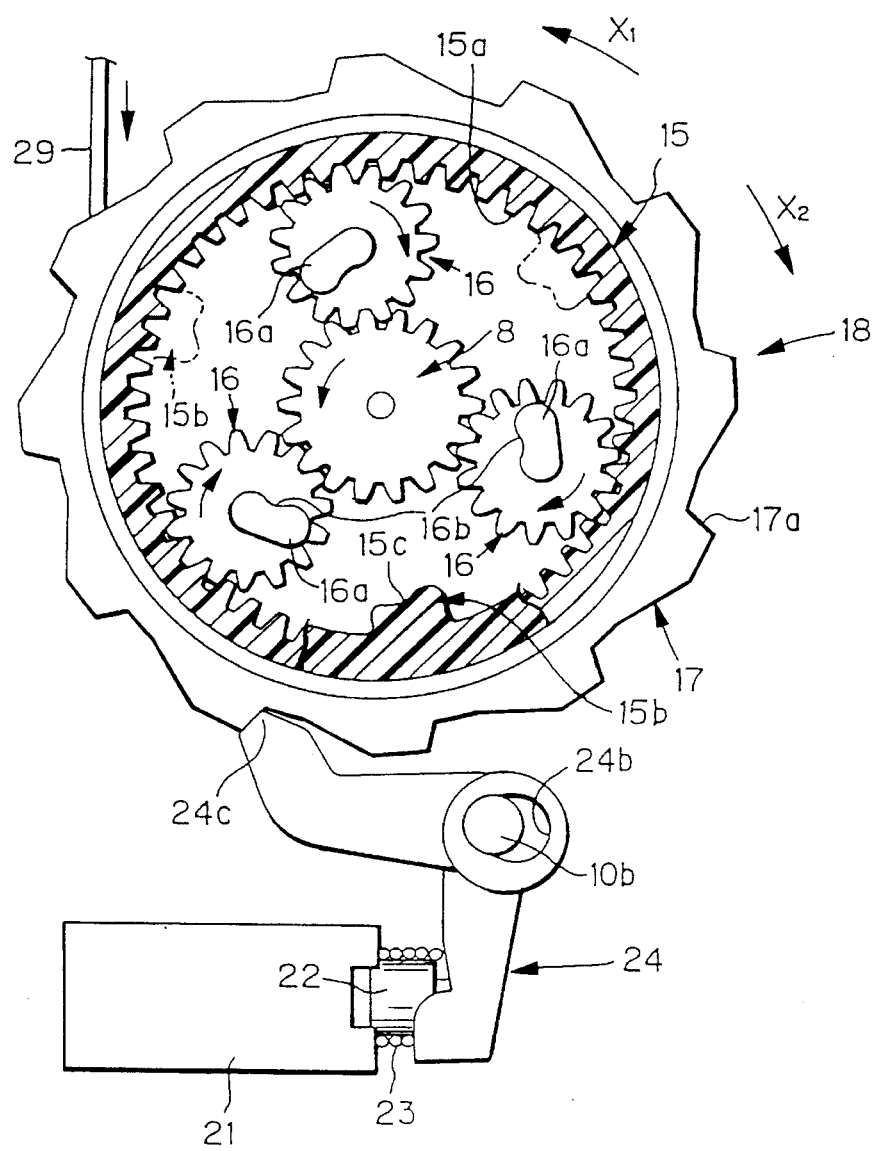
FIG. 6 is an enlarged view of the main portions of gear means employed in the invention, explaining the operation thereof.

When the occupant releases the webbing 29 in order to fit the seat belt to their body, then the webbing 29 is rewound and the main gear 8 is rotated in the arrow $X_1$ direction due to the energizing force $F_1$ of the first winding spring 9. Here, since the ratchet wheel 17 is prevented from rotating in the arrow $X_1$ direction by the lock arm 24, the planetary gears 16 using as their rotary shafts the support shafts 17b provided in the ratchet wheel 17 are prevented from rotating in the arrow $X_1$ direction with respect to the main gear 8, so that the planetary gears 16 in mesh with the main gear 8, as shown in FIG. 6, are caused to rotate clockwise, namely, in the opposite direction to the main gear 8.

Accordingly, the retainer 15 having the internal teeth 15a in mesh with the planetary gears 16 is decelerated with respect to the main gear 8 and is rotated in the arrow $X_2$ direction, that is, in the opposite direction to the webbing winding direction of the winding shaft 4. The second winding spring 20 having one end held in the securing groove 15c of the retainer 15 is tightened in the arrow $X_2$ direction which is the elastic energy storing direction, according to the rotation of the main gear 8 in the arrow $X_1$ direction.

In order words, the seat belt is worn by the occupant, the spring energizing force $F_2$ of the second winding spring 20 does not act in the webbing winding direction of the winding shaft 4 and, at the same time, the second winding spring 20 is tightened in the arrow $X_2$ direction due to the spring energizing force of the first winding spring 9 which rotates the main gear 8 in the arrow $X_1$ direction so that the tightening force of the second winding spring 20 acting in the opposite direction to the webbing winding direction of the winding shaft 4 cancels a portion of the energizing force $F_1$ of the first winding spring 9. This double effect reduces the webbing winding force F which operates on the winding reel 7. That is, by reducing the webbing winding force F of the winding reel 7, the seat belt tensile force can be reduced in such a manner that the occupant does not feel any sense of pressure while wearing the seat belt.

In this state, if the webbing 29 is drawn out, then the webbing winding force F of the winding reel 7 is reduced as described above until the webbing 29 is drawn out a proper amount in order to connect the tongue plate with the buckle so that the webbing 29 can be drawn out with a light force.

However, if the webbing 29 is drawn out more than the amount of winding when it is drawn out for connection of the tongue plate with the buckle as described above, then the engaging projections 16a of the planetary gears 16 are pressed against the engaging projections 15b of the retainer 15 in such a manner that the former projections 16a are opposed to the latter engaging portions 15b in the radial direction, so that the planetary gears 16 are prevented from rotating on their own axes. Therefore, the planetary gear 16 are prevented from rotating any further in the arrow $X_1$ direction with respect to the main gear 8 and the retainer 15 is directly connected with the winding shaft 4 through the main gear 8 and planetary gears 16 and is thus rotated in the arrow $X_2$ direction without being decelerated. Accordingly, similarly to a case when the seat belt is stored, the webbing 29 is drawn out against the combined energizing force of the spring energizing force $F_1$ of the first winding spring 9 and the spring energizing force $F_2$ of the second winding spring 20.

Figure 7:
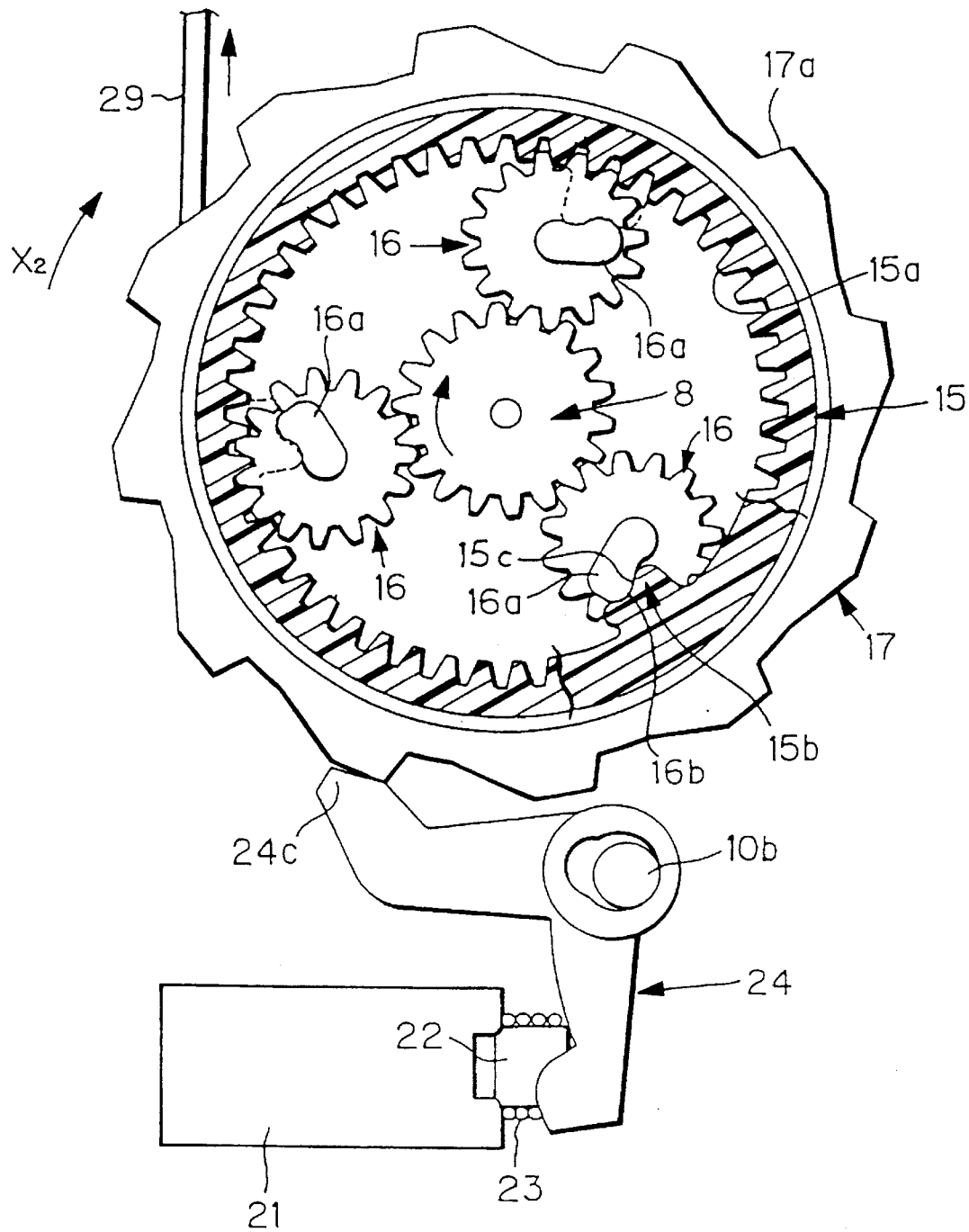
FIG. 7 is an enlarged view of the main portions of gear means employed in the invention explaining the operation thereof.

In this case, although the leading end engaging portion 24c of the lock arm 24 is engaged with the ratchet teeth 17a of the ratchet 17 and thus the ratchet wheel 17 is prevented from rotating in the arrow $X_1$ direction by the lock arm 24, there exists a clearance between the engaging boss hole 24b of the lock arm 24 and the support shaft 10*b* since the boss hole 24*b* is loosely fitted on the support shaft 10*b*. This allows the lock arm 24 to be swung counterclockwise an amount corresponding to the clearance so that the leading end engaging portion 24*c* of the lock arm 24, as shown in FIG. 7, can escape in a non-engaging direction from ratchet teeth 17*a*. As a result of this, the ratchet wheel 17 can be freely rotated in the arrow $X_2$ direction. Also, in this state, if the occupant releases the webbing 29, then, as described above, the rotation of the ratchet wheel 17 in the arrow $X_1$ direction is prevented to thereby reduce the seat belt tensile force.

Next, if the connection between the buckle and tongue plate of the seat belt device is removed when the occupant gets out of the vehicle and thus the detect signal is not output from the connection detect part 26 any longer, then the electromagnetic solenoid 21 is not excited any longer and the lock arm 24 is caused to rotate counterclockwise in FIG. 7 about the support shaft 10*b* due to the rotational force of the ratchet wheel 17, whereby the locking state of the lock arm 24 is removed. After then, the lock arm 24, in particular, the leading end engaging portion 24*c* of the lock arm 24 is held by the spring force of the coil spring 23 in such a position that it is not in mesh with the ratchet teeth 17*a* of the ratchet wheel 17.

The main gear 8 and retainer 15 are respectively rotated in the webbing winding direction due to the first and second winding springs 9 and 20, and the main gear 8 and retainer 15 are respectively rotated until the winding reel 7 is placed into the full winding state. During this, the retainer 15 is rotated in an instant in the webbing winding direction due to the second winding spring 20 in such a manner that no rotational load is applied to the retainer 15, and the engaging projections 15*b* of the retainer 15 are engaged with the engaging projections 16*a* of the planetary gears 16 so that the retainer 15 is directly connected with the winding shaft 4, with the result that the retainer 15 is rotated in the webbing winding direction integrally with the main gear 8.

That is, in the seat belt storing time, since the spring energizing force $F_2$ of the second winding spring 20 is operated in the same direction as the spring energizing force $F_1$ of the first winding spring 9, the combined energizing force of the spring energizing force $F_1$ of the first winding spring 9 and the spring energizing force $F_2$ of the second winding spring 20 is applied to the winding shaft 4 in the arrow $X_1$ direction as the webbing winding force F.

Also, in the seat belt wearing time, the retainer 15 of the planetary gear device 18 is decelerated with respect to the main gear 8 and is rotated in the opposite direction relative to the winding shaft 4, so that the second winding spring 20 is tightened in the arrow $X_2$ direction or in the elastic energy storage direction according to the rotation of the main gear 8 in the arrow $X_1$ direction and thus the tightening force of the second winding spring 20 cancels the spring energizing force $F_1$ of the first winding spring 9. As a result of this, the reduced webbing winding force F is applied to the winding shaft 4, so that the seat belt tensile force can be reduced.

Accordingly, since the energizing forces of the first and second winding springs 9 and 20 are respectively applied to the winding shaft 4 regardless of whether the seat belt is worn or stored, the loads respectively applied to the first and second winding springs 9 and 20 can be reduced and the stresses applied to the first and second springs 9 and 20 can be reduced. Due to this, the first and second winding springs 9 and 20 can be reduced in size and can also be improved in durability.

This makes it possible to reduce the area to be occupied by the first and second winding springs 9 and 20 in the retractor, which is advantageous in minimizing the mounting space of the vehicle necessary for mounting the retractor into the vehicle.

Figure 8:
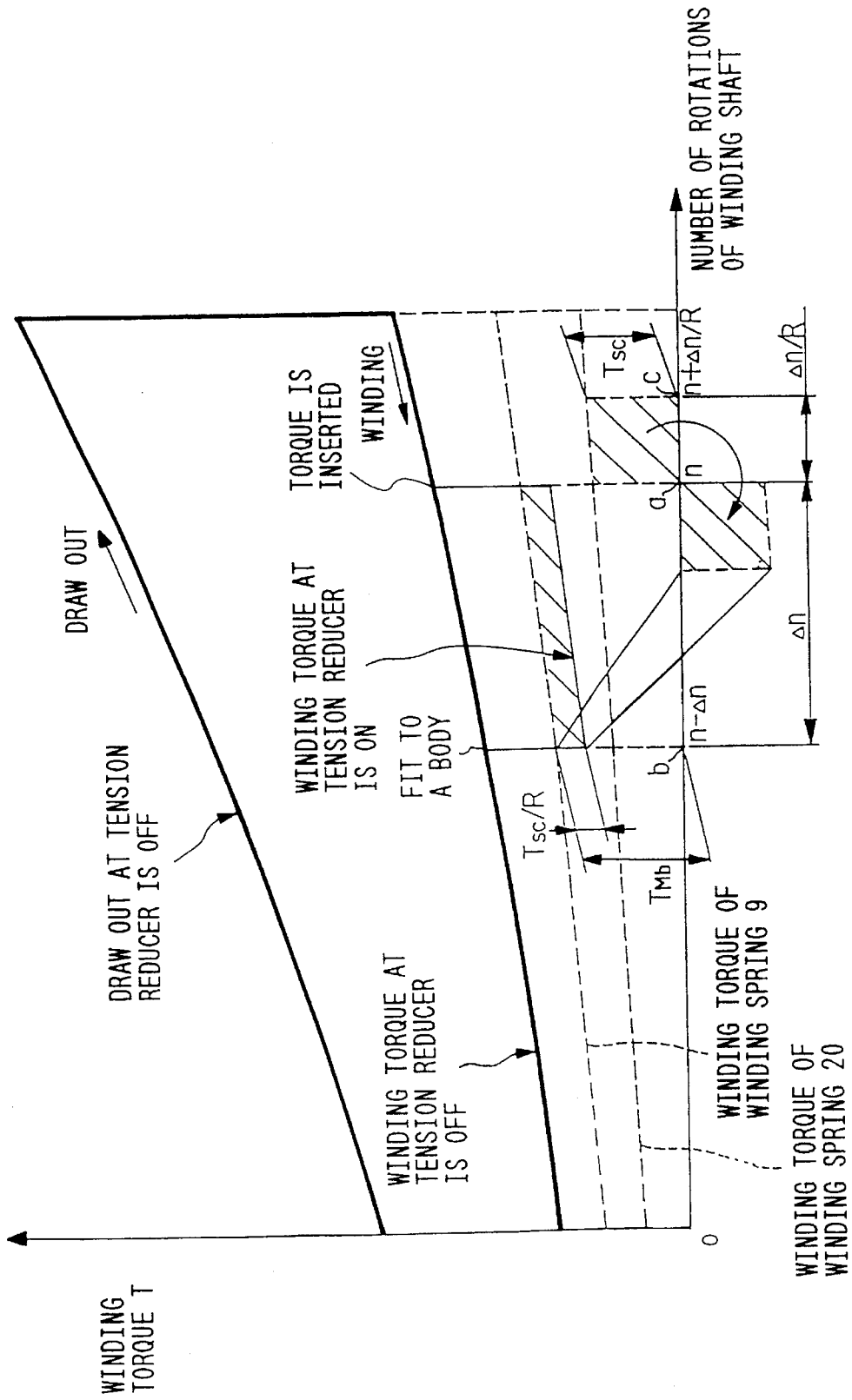
FIG. 8 is a graphical representation of a relationship between a webbing winding torque and the number of rotations of the winding shaft of the retractor.

Next, a winding torque in the above-mentioned winding force reducing mechanism will be described with reference to FIG. 8. FIG. 8 is a graphical representation of the values of the winding torque of the retractor with respect to the number of rotations of the winding shaft which rotates with the drawout of the webbing, while the value of the winding torque for the amount of the fully wound webbing is set for 0.

The winding torque of the retractor when the seat belt is worn is provided in such a manner that a value obtained by dividing the tightening torque of the second winding spring 20 produced when it is tightened, by a deceleration ratio R (a deceleration ratio of the retainer 15 to the main gear 8) is subtracted from the winding torque of the first winding spring 9. For example, the number of rotations of the winding shaft 4 (at a point of a) when the tongue plate is inserted into the buckle is expressed as n, the number of rotations thereof (at a point of b) when the webbing 29 is fitted to the body of the occupant is expressed as (n–Δn), and the winding torque of the first winding spring 9 at the point of b is expressed as $T_{Mb}$. Here, the retainer 15 with the second winding spring 20 secured thereto is decelerated with respect to the rotation of the main gear 8 with the first winding spring 9 secured thereto and is rotated in the opposite direction with respect to the main gear 8, and the number of rotations of the retainer 15 at the time becomes the number of rotations at the time (a point of c) when the winding shaft 4 is rotated (n+Δn/R) and, therefore, the tightening torque of the second winding spring 20 produced when it is tightened provides $T_{sc}$. That is, if the winding torque of the winding shaft 4 when the webbing 29 is made to fit to the occupant body is expressed as $T_R$, then there can be obtained $T_R = T_{Mb} - T_{Sc}/R$.

Here, if the webbing winding amount (Δn) obtained from the insertion of the tongue plate into the buckle to the fitting of the webbing to the occupant body is large, then an increase in the winding torque of the second winding spring 20 to cancel the winding torque of the first winding spring 9 is large, so that a sense of wearing of the webbing is different from a sense of wearing the webbing when the webbing is wound only a small amount. In view of this, in the first embodiment, the rotation of the retainer 15 is decelerated to thereby reduce the difference between the webbing wearing senses and, at the same time, the tightening of the second winding spring 20 is reduced to thereby enhance the durability thereof. Also, in the winding torque curve shown in FIG. 8, for the purpose of explanation, the webbing winding amount (Δn) is shown large. However, in the actual seat belt device, since the webbing is fitted to the occupant body by a webbing winding amount in a shorter range of the webbing winding amount, influences caused by the rising of the tightening torque of the second winding spring 20 produced when it is tightened can be substantially neglected by the above-mentioned deceleration.

Thus, what is important in the first embodiment is that, by means of the operation of the planetary gear device 18 in when the seat belt is being worn by the occupant, the retainer 15 is rotated in the opposite direction with respect to the rotation of the main gear 8 and is decelerated. That is, the number of tightening rotations of the second winding spring 20 which operates in a manner to cancel the energizing force of the first winding spring 9 in the seat belt wearing time is a value obtained when the number of rotations of the main gear 8 is divided by the deceleration ratio R, thereby reducing the rising of the tightening torque of the second winding spring 20 produced when it is tightened. Therefore, the webbing wearing sense is not affected substantially by the rising of the tightening torque of the second winding spring 20, so that a good sense of wearing of the webbing can be obtained.

Figure 9:
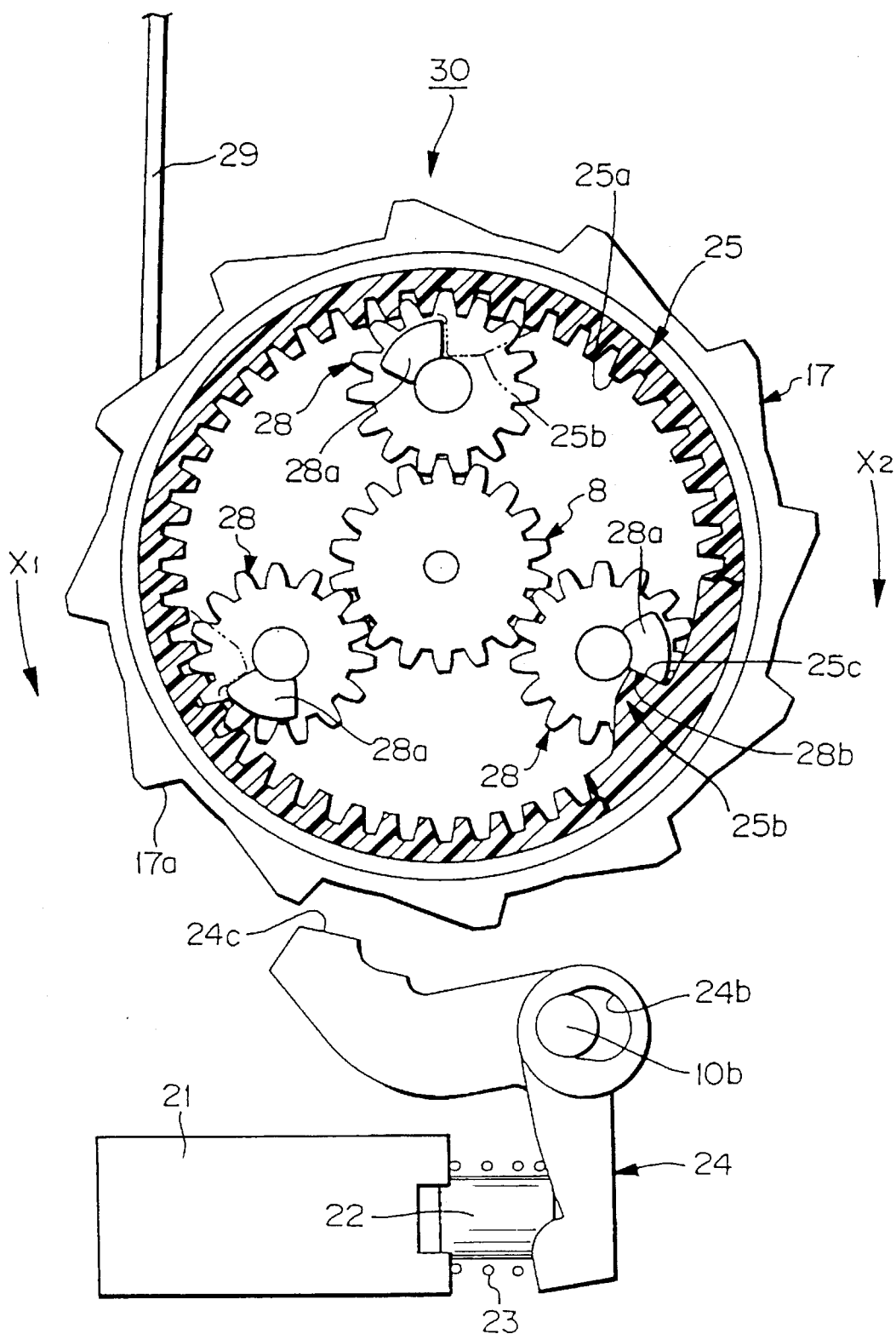
FIG. 9 is an enlarged view of the main portions of gear means employed in a second embodiment of a retractor for a seat belt according to the invention.

FIG. 9 is an enlarged view of the main portions of a planetary gear device 30 which serves as gear means employed in a second embodiment of a retractor for a seat belt according to the invention. The planetary gear device 30 is similar in structure to the planetary gear device 18 employed in the first embodiment. However, the device 30 is different from the device 18 in the structure of the stopper means which restricts the rotation of planetary gears 28 on their own axes as well as the relative movement of the planetary gears 28 with respect to the retainer 25 in the webbing draw-out operation.

The stopper means of the planetary gear device 30 employed in the second embodiment includes a plurality of engaging projections 25b respectively formed inwardly of the internal teeth 25a of the retainer 25 and a plurality of engaging projections 28a respectively formed on the side surfaces of the planetary gears 28 opposed to the bottom surface of the retainer 25. The engaging projections 28a are respectively provided on the side surfaces of the planetary gears 28 in such a manner that they are accommodated within the tip pitch circle of the planetary gears 28. The side surfaces 28b of the engaging projections 28a, which are situated on the rear side with respect to the rotation direction of the planetary gears 28 rotatable on their own axes counterclockwise in FIG. 9, are pressed against the opposing surfaces 25c of the engaging projections 25b of the retainer 25 in such a manner that the side surfaces 28b respectively oppose the opposing surfaces 25c substantially in the circumferential direction of the retainer 25.

That is, before the occupant wears the seat belt, the engaging projections 28a of the planetary gears 28 in mesh with both the main gear 8 and retainer 25 are respectively pressed against the engaging projections 25b of the retainer 25 in such a manner that a compression force can be applied in the circumferential direction, thereby preventing the retainer 25 from moving in a direction of an arrow $X_1$ in FIG. 9 with respect to the planetary gears 28. Here, since the planetary gears 28 are also in mesh with the main gear 8, the retainer 25 is prevented from rotating in the arrow $X_1$ direction with respect to the main gear 8 as well and stands still as shown in FIG. 9.

An engaging operation between the engaging projections 25b of the retainer 25 and the engaging projections 28a of the planetary gears 28 will be described below.

Figure 10A:
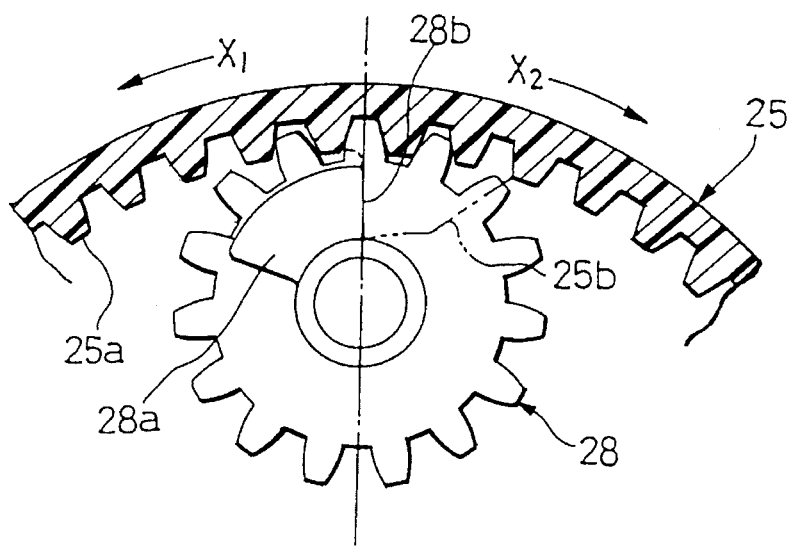
FIGS. 10(a) to 10(c) are enlarged sectional views of the main portions of the gear means, explaining the engaging operation of stopper means shown in FIG. 9.
Figure 10B:
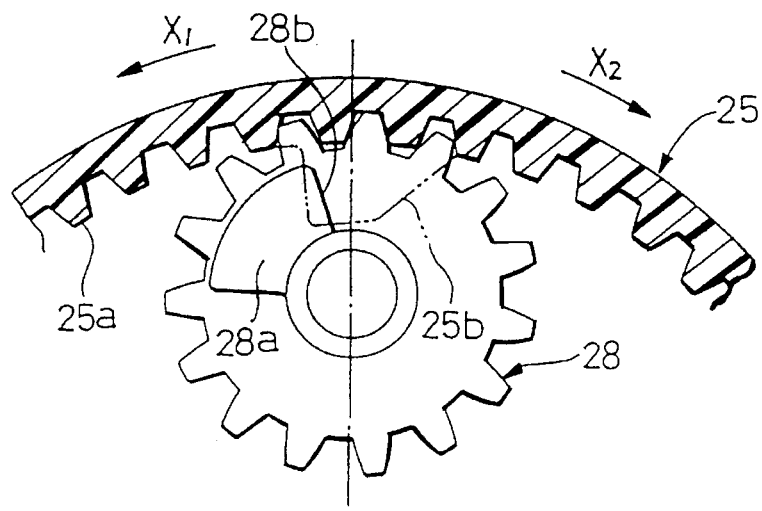
Figure 10C:
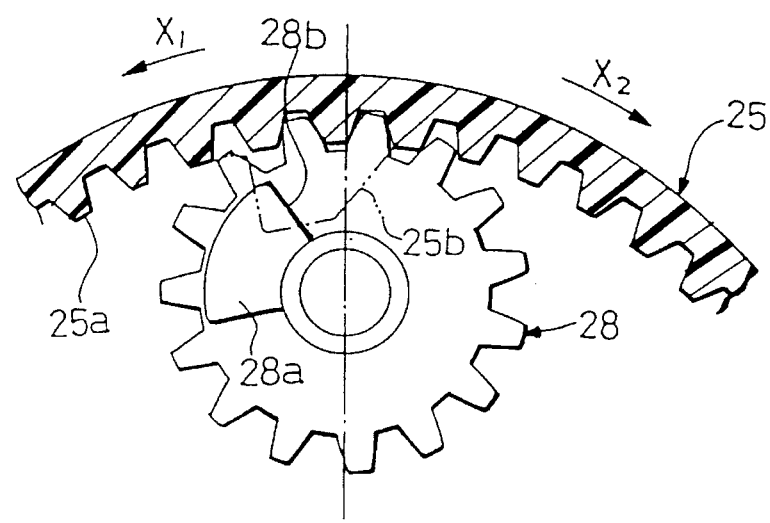

If the main gear 8 is going to rotate in a direction of an arrow $X_2$ in FIG. 9 from its initial state shown in FIG. 9, then the planetary gears 28 are going to rotate on their own axes counterclockwise in FIG. 9 and to move in the arrow $X_1$ direction with respect to the main gear 8, and the retainer 25 is going to rotate in the arrow $X_1$ direction with respect to the main gear 8. Here, if it is assumed that interference between the engaging projections 25b of the retainer 25 and the engaging projections 28a of the planetary gears 28 can be neglected, as shown in FIGS. 10 (a) to 10 (c), the retainer 25 rotates in the arrow $X_1$ direction with respect to the main gear 8. Thus, while rotating on their own axes counterclockwise, the planetary gears 28 move in the arrow $X_1$ direction with respect to the main gear 8. However, as can be seen from FIGS. 10(a) to 10(c), such movement cannot occur due to the interference between the engaging projections 28a of the planetary gears 28 going to move in the arrow $X_1$ direction with respect to the main gear 8 and the engaging projections 25b of the retainer 25 going to rotate in the arrow $X_1$ direction with respect to the main gear 8.

That is, the amount of the rotational movement of the engaging projections 25b of the retainer 25 in the arrow $X_1$ direction is larger than the amount of the rotational movement of the planetary gears 28 in the arrow $X_1$ direction while rotating counterclockwise in FIGS. 10(a) to 10(c) on their own axes, which allows engagement between the engaging projections 25b of the retainer 25 and the engaging projections 28a of the planetary gears 28.

Therefore, when the opposing surfaces 25c of the engaging projections 25b of the retainer 25 and the side surfaces 28b of the engaging projections 28a of the planetary gears 28 are engaged with each other in such a manner that they are pressed against each other in the circumferential direction in a mutually opposing manner, then the rotation of the planetary gears 28 on their own axes is prevented so that the planetary gears 28 cannot move any further in the arrow $X_1$ direction with respect to the main gear 8, while the retainer 25 is also prevented from rotating in the arrow $X_1$ direction with respect to the main gear 8. On the other hand, when the engaging projections 25b of the retainer 25 move in the arrow $X_2$ direction with respect to the main gear 8 and the planetary gears 28 move in the arrow $X_2$ direction with respect to the main gear 8 while rotating on their own axes clockwise in FIG. 10, the engaging projections 25b of the retainer 25 and the engaging projections 28a of the planetary gears 28 are not engaged with each other and, therefore, the planetary gears 28 can move in the arrow $X_2$ direction with respect to the main gear 8 while rotating on their own axes and, at the same time, the retainer 25 can also rotate in the arrow $X_2$ direction with respect to the main gear 8.

Similar to the first embodiment, after the webbing 29 is drawn out a proper amount from the retractor, the tongue plate and buckle of the seat belt device are connected to each other and the lock arm 24 prevents the ratchet wheel 17 from rotating in the arrow $X_1$ direction. Subsequently, the webbing 29 is wound a small amount until the seat belt fits the occupant body and the main gear 8 is rotated in the arrow $X_1$ direction. However, since the rotation of the ratchet wheel 17 in the arrow $X_1$ direction is locked, the planetary gears 28 are prevented from moving in the arrow $X_1$ direction with respect to the main gear 8 and, at that position, the planetary gears 28 rotate on their own axes counterclockwise, that is, in the opposite direction to the main gear 8. Here, since the stopper means consisting of the engaging projections 28a of the planetary gears 28 and the engaging projections 25b of the retainer 25 permits the relative rotation of the retainer 25 in the arrow $X_2$ direction, the retainer 25 in mesh with the planetary gears 28 is rotated in the arrow $X_2$ direction to tighten the second winding spring 20 in the arrow $X_2$ direction which is the elastic energy storing direction, thereby reducing the seat belt tensile force.

In the stopper means employed in the above-mentioned planetary gear device 30, the mutually pressable side surfaces 28b of the engaging projections 28a of the planetary gears 28 and the opposing surfaces 25c of the engaging projections 25b of the retainer 25 are respectively formed in a surface almost perpendicular to the peripheral direction of the retainer 25 and, between the side surfaces 28b and opposing surfaces 25c, a compression force is applied substantially in the peripheral direction of the retainer 25. Thus, while the planetary gears 28 are in their meshing condition in which the side surfaces 28b thereof are respectively pressed against the opposing surfaces 25c of the retainer 25 to thereby prevent the planetary gears 28 from rotating on their own axes as well as from moving in the arrow $X_1$ direction with respect to the main gear 8, compression force acting between the side surfaces 28b and opposing surface 25c makes it difficult to apply such a force to the planetary gears 28 as it presses the planetary gears 28 against the retainer 25 and main gear 8 in the radial direction thereof to thereby cause the two gears to mesh with each other.

Therefore, when the winding force reducing mechanism is not in operation, the stopper means is engaged to bring the planetary gears 28 into direct connection with the retainer 25. Then, when the winding force reducing mechanism is put into operation and thus the retainer 25 starts to rotate in the arrow $X_2$ direction with respect to the main gear 8, resistance due to the mutually meshing gears is removed so that the webbing operation can be improved.

Figure 11:
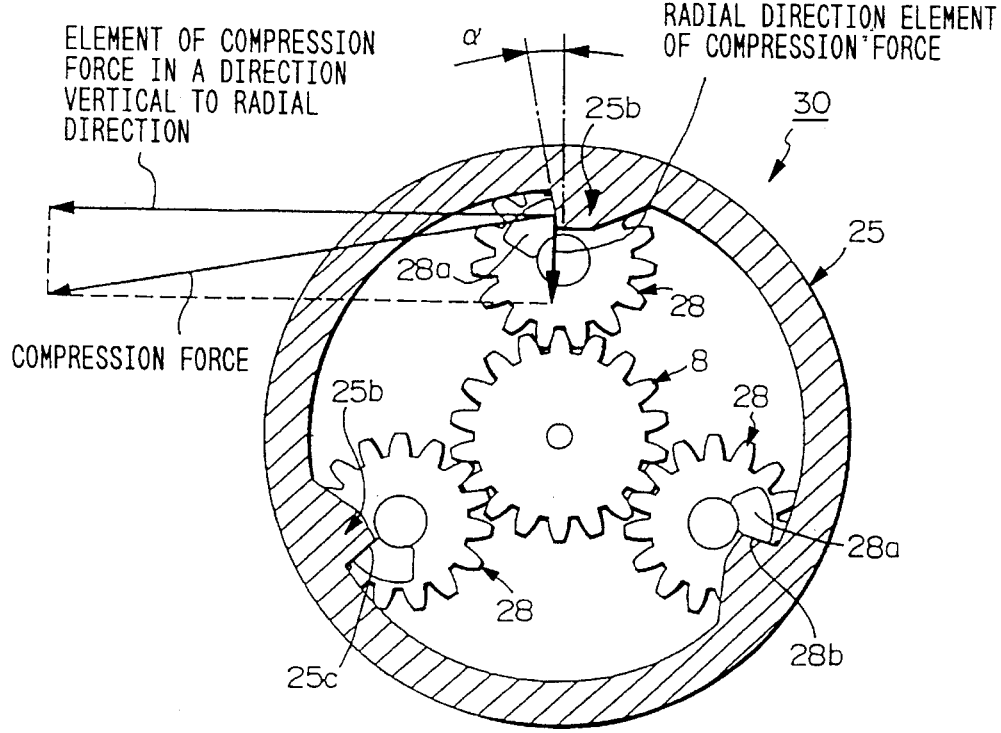
FIG. 11 is a schematic sectional view of the gear means, explaining the operating direction of a compression force acting on the stopper means shown in FIG. 9.
Figure 12:
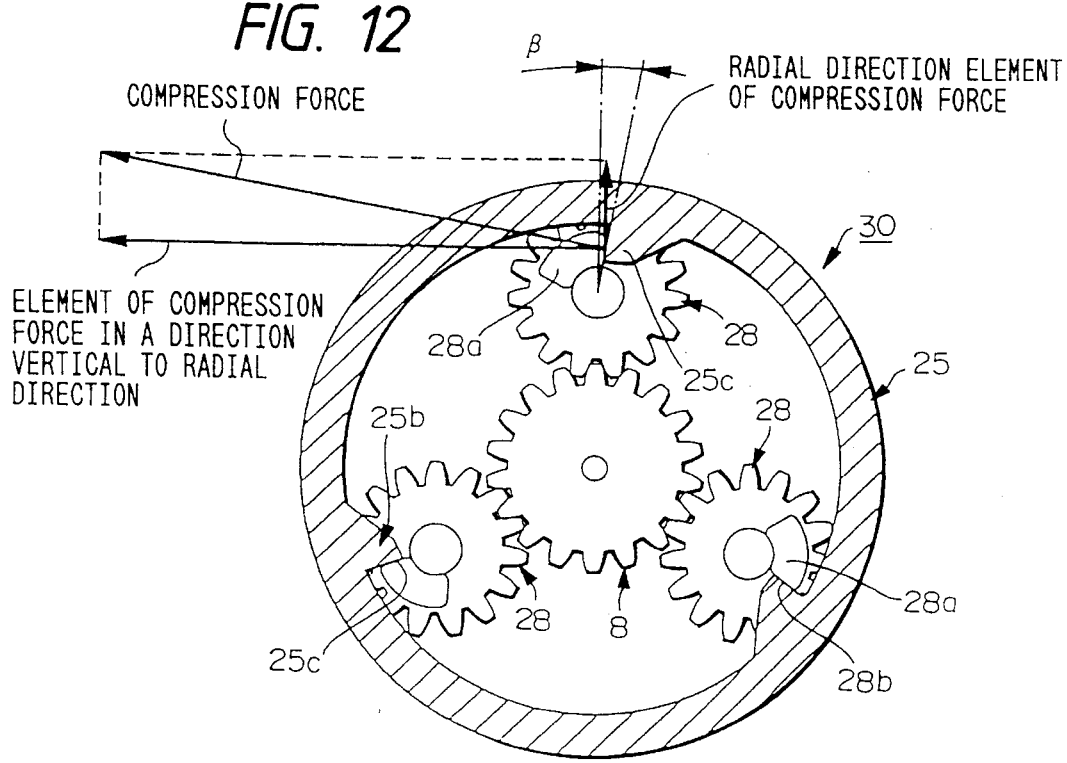
FIG. 12 is a schematic sectional view of the gear means, explaining the operating direction of a compression force acting on the stopper means shown in FIG. 9.

FIGS. 11 and 12 are respectively schematic section views of the planetary gear device 30, explaining the operating direction of the compression force acting between the side surfaces 28b and opposing surfaces 25c. In particular, FIG. 11 shows a condition in which the side surfaces 28b and opposing surfaces 25c are inclined in such a manner that the operating direction of the compression force to be applied onto the side surfaces 28b by the opposing surfaces 25c goes in the inner radial direction of the device 30 by an angle of α from the peripheral direction of the retainer 25. FIG. 12 shows a condition in which the surfaces 28b and opposing surfaces 25c are inclined in such a manner that the operating direction of the compression force to be applied onto the side surfaces 28b by the opposing surfaces 25c goes in the outer radial direction of the device 30 by an angle of β from the peripheral direction of the retainer 25.

In other words, in such a case as shown in FIG. 11, the radial direction component of the compression force to be applied onto the side surface 28b by the opposing surface 25c goes toward the central direction of rotation of the main gear 8, and the planetary gears 28 are pressed against the main gear 8. Also, in such a case as shown in FIG. 12, the radial direction component of the compression force to be applied onto the side surfaces 28b by the opposing surfaces 25c goes outwardly in the radial direction of the main gear 8, and the planetary gears 28 are pressed against the retainer 28. Therefore, if the inclination angles α and β are respectively decreased, then the respective radial direction components are decreased to thereby be able to prevent the meshing of the gears.

Further, in the case shown in FIG. 11, due to the radial direction component of the compression force, the planetary gears 28 push against and spread the retainer 25 outwardly in the radial direction and the planetary gears 28 themselves are pressed against the main gear 8. Therefore, when the inclination angle α is increased due to variations in parts accuracy and assembling accuracy and the like, there is a possibility that all of the main gear 8, planetary gears 28 and retainer 25 can mesh with one another. On the other hand, in the case shown in FIG. 12, the planetary gears 28 receive the force in such a direction that allows the planetary gears 28 to mesh with only the retainer 25, and the planetary gear 28 has no influence on the main gear 8. For this reason, when the inclination angle β is increased, then only the planetary gears 28 and the retainer 25 are allowed to mesh with each other, but the main gear 8 is prevented from meshing. If the winding force reducing mechanism is put into operation, then the main gear 8, on receiving the energizing force of the first winding spring 9, is rotated by an amount corresponding to the backlash thereof and then meshes with the planetary gears 28, thereby removing the engagement between the planetary gears 28 and retainer 25.

In other words, if the inclination angles α and β can be set to 0, then the radial direction component of the compression force acting between the side surfaces 28b and opposing surfaces 25c becomes 0 to thereby prevent the meshing completely. However, since it is difficult to set the inclination angles α and β for 0 completely due to variations in the parts accuracy and assembling accuracy and the like, it is especially preferable that the side surfaces 28b and opposing surfaces 25c are previously inclined in such a manner that the operating direction of the compression to be applied onto the side surfaces 28b by the opposing surfaces 25c goes outwardly in the radial direction by the angle β with respect to the peripheral direction of the retainer 25.

Figure 13:
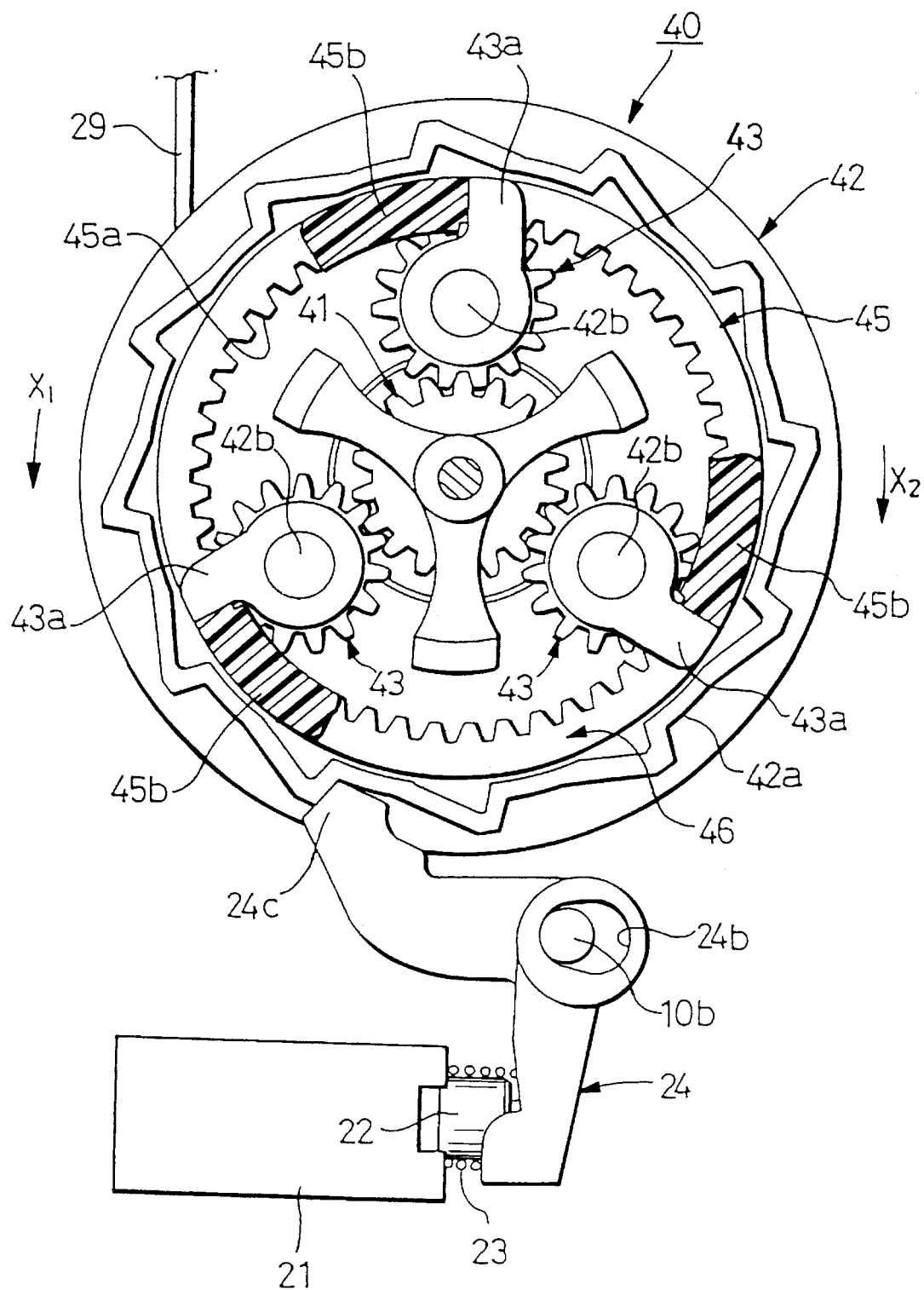
FIG. 13 is an enlarged view of the main portions of gear means employed in a third embodiment of a retractor for a seat belt according to the invention.
Figure 14:
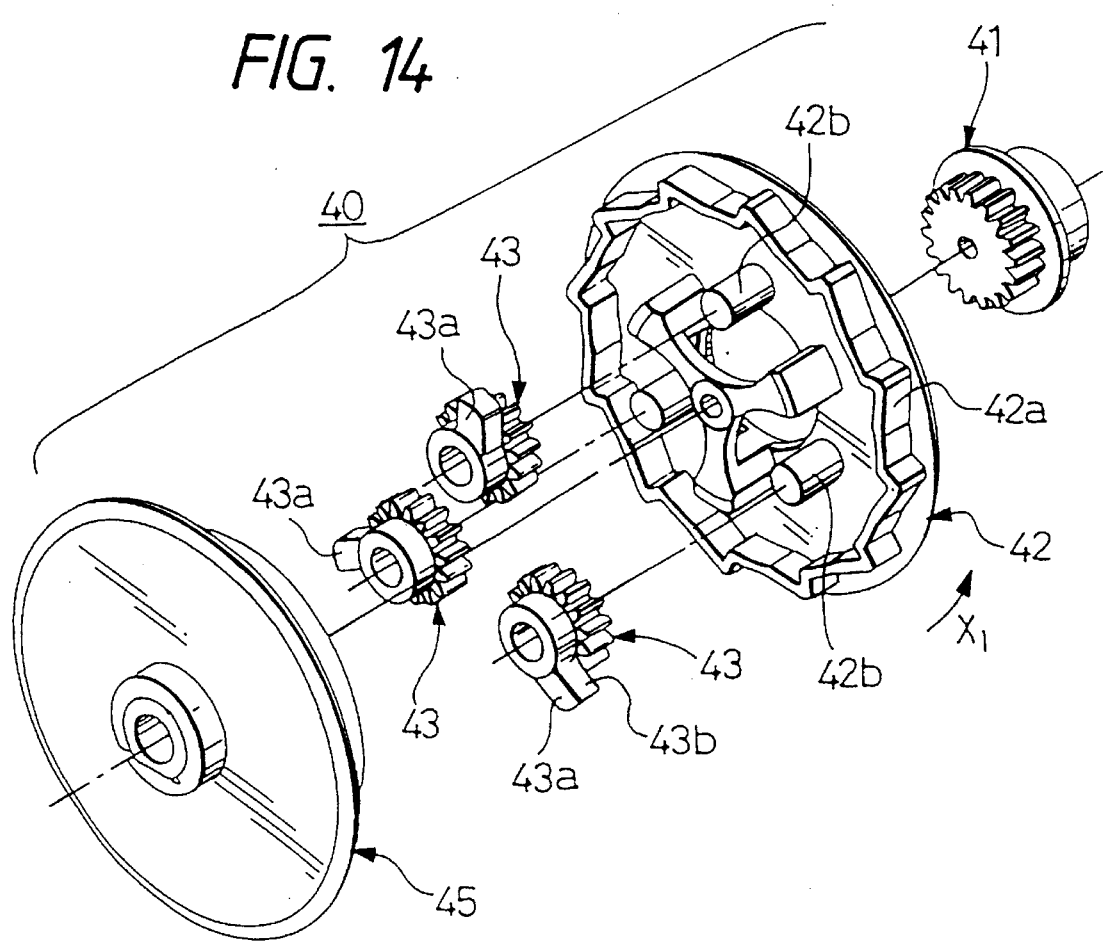
FIG. 14 is an exploded perspective view of the gear means shown in FIG. 13.

FIGS. 13 and 14 are respectively an enlarged view and an exploded perspective view of the main portions of a planetary gear device 40 which serves as gear means employed in a third embodiment of the invention. The planetary gear device 40 according to the third embodiment is substantially similar in structure to the planetary gear mechanisms 18 and 30 respectively employed in the first and second embodiments but is different in the structure of the stopper means which prevents not only the rotation on their own axes of planetary gears 43 but also the relative movement of the planetary gears 43 with respect to a retainer 45.

Figure 15:
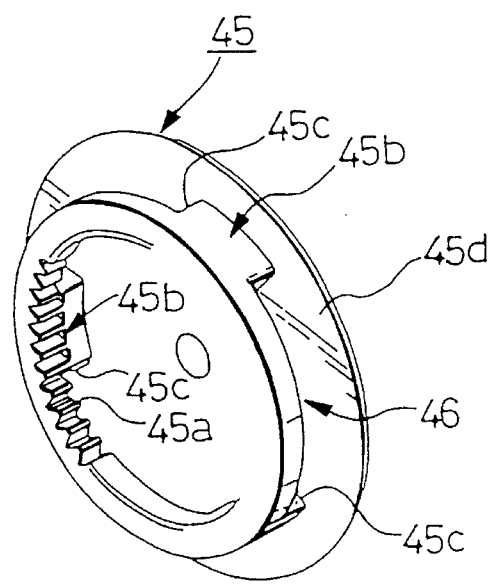
FIG. 15 is a perspective view of the whole of a retainer shown in FIG. 14.

The stopper means in the planetary gear device 40 includes a plurality of engaging support portions 45b respectively formed between the inner teeth 45a and flange portions 45d of the retainer 45, and a plurality of engaging projections 43a respectively provided on the side surface of the planetary gears 43 opposed to the bottom surface of the retainer 45. Each of the engaging projections 43a of the planetary gears 43 is provided on the side surface of the planetary gear 43 in the form of a leading end portion projected outwardly of the tip pitch circle of the planetary gear 43. The side surface 43b of the engaging projection 43a situated on the front side with respect to the rotational direction of the planetary gear 43 rotating on its own axis counterclockwise in FIG. 13 is pressed against the opposing surface 45c of the engaging support portion 45b of the retainer 45 in such a manner that it is opposed substantially in the peripheral direction of the retainer 45. Also, as shown in FIG. 15, the engaging support portions 45b of the retainer 45 are respectively formed in three positions between the inner teeth 45a and flange portions 45d of the retainer 45 and, between the respective engaging support portions 45b, there are formed three spaces 46 which are respectively used to prevent interference with the engaging projections 43a of the planetary gears 43. When the engaging projections 43a of the planetary gears 43 are not in engagement with the engaging support portions 45b of the retainer 45, the planetary gears 43 are able to move with respect to the retainer 45 while the planetary gears 43 are rotating on their own axes.

Therefore, when the opposing surfaces 45c of the engaging support portions 45b of the retainer 45 are pressed against and engaged with the side surfaces 43b of the engaging projections 43a of the planetary gears 43 in such a manner that they are opposed to the peripheral direction of the retainer 45, then not only are the planetary gears 43 prevented from rotating on their own axes and are thus prevented from moving in the arrow $X_1$ direction with respect to the main gear 41, but also the retainer 45 is prevented from rotating in the arrow $X_1$ direction with respect to the main gear 41. On the other hand, when the engaging support portions 45b of the retainer 45 are moved in the arrow $X_2$ direction with respect to the main gear 41 and the planetary gears 43 are moved in the arrow $X_2$ direction with respect to the main gear 41 while rotating on their own axes clockwise in FIG. 13, the engaging support portions 45b of the retainer 45 are not engaged with the engaging projections 43a of the planetary gears 43 and, therefore, the planetary gears 43 are able to move in the arrow $X_2$ direction with respect to the main gear 41 while rotating on their own axes and the retainer 45 is also able to rotate in the arrow $X_2$ direction with respect to the main gear 41.

Figure 16:
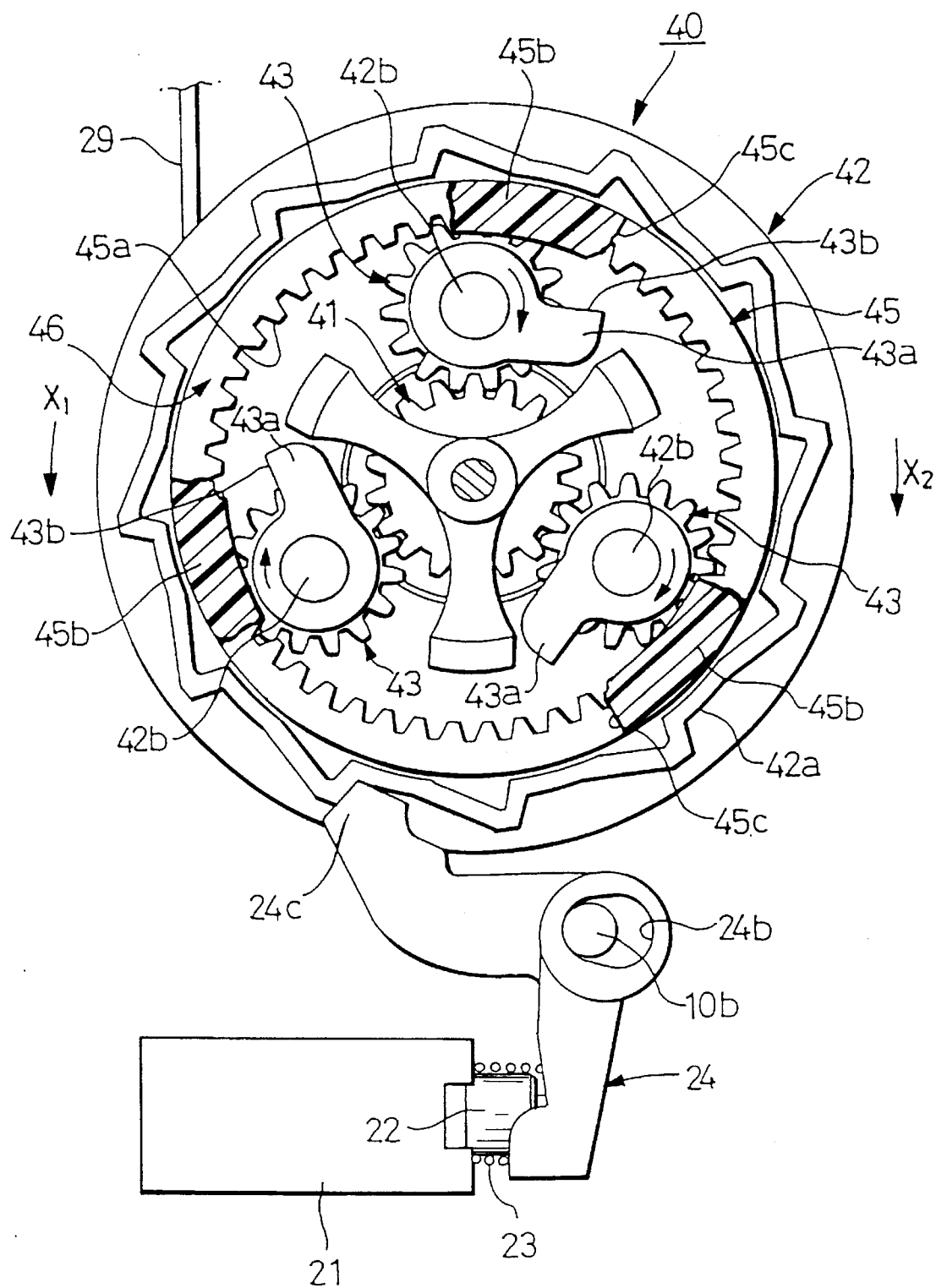
FIG. 16 is an enlarged sectional view of the main portions of the gear means, explaining the engaging operation of stopper means shown in FIG. 13.

Similarly to the above-mentioned first and second embodiments, after the webbing 29 is drawn out from the retractor by a proper amount, the tongue plate and buckle of the seat belt device are connected to each other and the lock arm 24 locks the rotation of the ratchet wheel 17 in the arrow $X_1$ direction. Then, as shown in FIG. 16, the webbing 29 is wound a small amount until the seat belt fits the occupant body and the main gear 41 is rotated in the arrow $X_1$ direction. However, since the rotation of the ratchet wheel 42 in the arrow $X_1$ direction is locked, the planetary gear 43 is prevented from rotating in the arrow $X_1$ direction with respect to the main gear 41 and thus, at that position, the planetary gear 43 rotates on it own axis clockwise, that is, in the opposite direction to the main gear 41. During this operation, the retainer 45 in mesh with the planetary gears 43 is rotated in the arrow $X_2$ direction to tighten the second winding spring 20 in the arrow $X_2$ direction which is the elastic energy storing direction, thereby being able to reduce the seat belt tensile force, because the stopper means consisting of the engaging projections 43a of the planetary gears 43 and the engaging support portions 45b of the retainer 45 is structured such that it allows the relative rotation of the retainer 45 in the arrow $X_2$ direction.

In the stopper means included in the planetary gear device 40, the engaging projections 43a provided on the side surface of the planetary gears 43, which can be respectively pressed against the engaging support portions 45b of the retainer 45, project outwardly of the tip pitch circle of the planetary gears 43, while the side surfaces 43b of the engaging projections 43a are opposed substantially in the peripheral direction of the retainer 45 to the opposing surfaces 45c of the engaging support portions 45b of the retainer 45 outside of the tip pitch circle of the planetary gears 43. This makes it possible not only to increase the diameters of the axial holes of the planetary gears 43 to be supported by the support shaft 42b of the ratchet wheel 42 but also to increase the sizes of the engaging projections 43a themselves. That is, because the diameter of the support shaft 42b can be increased, the supporting rigidity of the support shaft 42b can be increased and the securing resisting force of the engaging projections 43a can be enhanced.

The side surfaces 43b of the engaging projections 43a of the planetary gears 43 and the opposing surfaces 45c of the engaging support portions 45b of the retainer 45 are respectively formed in surfaces almost perpendicular to the peripheral direction of the retainer 45 and, between the side surfaces 43b and opposing surfaces 45c, a compression force is applied in the peripheral direction of the retainer 45. Therefore, a force pressing the planetary gears 43 against the retainer 45 and the main gear 41 in the radial direction thereof for meshing with the two gears by means of the compression force acting between the side surfaces 43b and opposing surfaces 45c is not applied to the planetary gears 43 in their meshing states in which the side surfaces 43b thereof are pressed against the opposing surfaces 45c of the retainer 45 to thereby prevent not only the rotation of the planetary gears 43 on their own axes but also the relative movement of the planetary gear 43 in the arrow $X_1$ direction with respect to the main gear 41.

Therefore, while the stopper means is engaged to put the planetary gear 43 into its direct connection condition when the winding force reducing mechanism is not in operation, when the winding force reducing mechanism is put into operation and the retainer 45 thereby starts to rotate in the arrow $X_2$ direction with respect to the main gear 41, the resistance due to the meshing gears is removed from the planetary gears 43, thereby improving the webbing operation.

Further, when the winding force reducing mechanism is removed and the engaging projections 43a of the planetary gears 43 are thereby engaged with the engaging support portions 45b of the retainer 45 to return the planetary gears 43 to their direct connection conditions, the engaging projections 43a of the planetary gears 43 respectively enter the above-mentioned spaces 46 of the retainer 45 to thereby prevent the planetary gears 43 from rising. This assures the positive engagement between the planetary gears 43 and the retainer 45.

Figure 17:
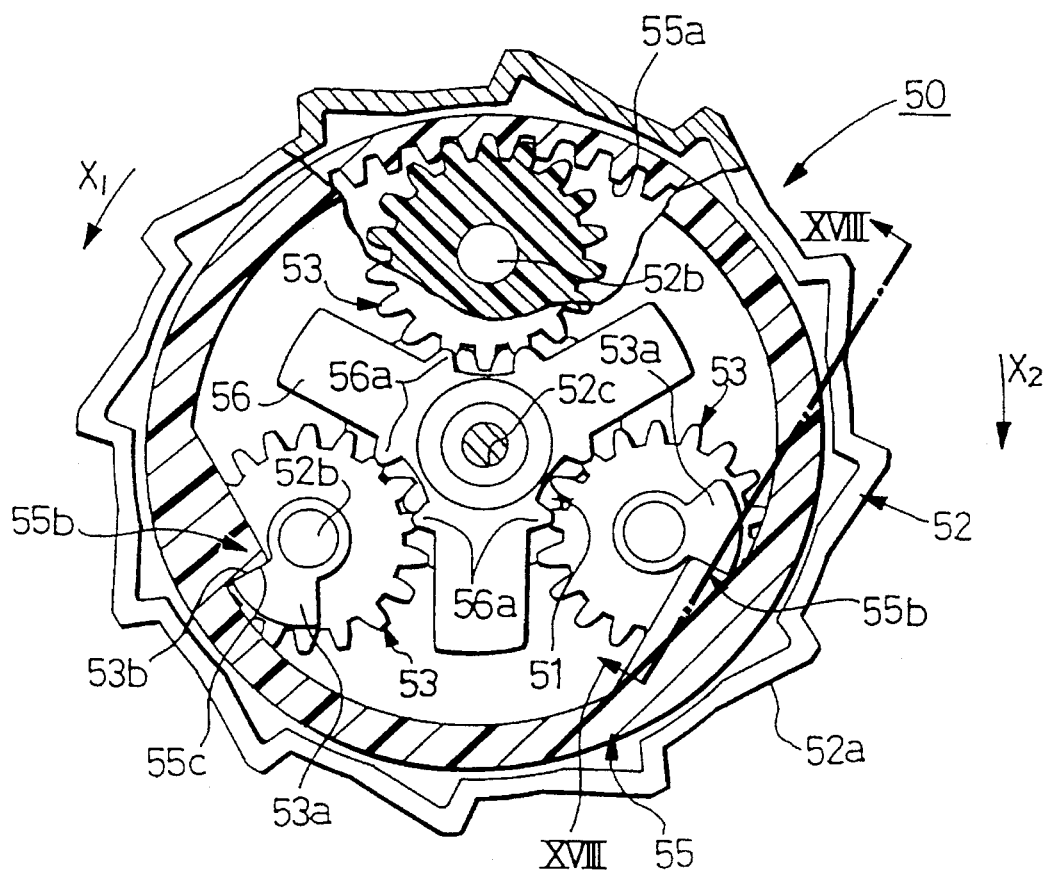
FIG. 17 is a partly broken enlarged view of gear means employed in a fourth embodiment of a retractor for a seat belt according to the invention.

FIG. 17 is an enlarged view of the main portions of a planetary gear device 50 which is a gear means employed in a fourth embodiment of a retractor for a seat belt according to the invention. The planetary gear device 50 has a substantially similar structure to the planetary gear device 30 in the above-mentioned second embodiment but is different in the structure of its stopper means which prevents not only the rotation of planetary gears 53 on their own axes but also the relative movement of the planetary gears 53 with respect to a retainer 55 in a webbing draw-out operation.

The stopper means employed in the fourth embodiment includes a plurality of engaging projections 55b formed inwardly of the internal teeth 55a of the retainer 55, and a plurality of engaging projections 53a formed on the side surfaces of the planetary gears 53 opposed to the bottom surface of the retainer 55. The engaging projections 53a of the planetary gears 53 are respectively provided on the side surfaces of the planetary gears 53 in such a manner that they can be stored within the tip pitch circle of the planetary gears 53. The side surfaces 53b of the engaging projections 53a situated on the rear side with respect to the rotational direction of the planetary gears 53 rotating on their own axes counterclockwise in FIG. 17 are respectively pressed against the opposing surfaces 55c of the engaging projections 55b of the retainer 55 in a mutually opposing manner.

That is, when the opposing surfaces 55c of the engaging projections 55b of the retainer 55 and the side surfaces 53b of the engaging projections 53a of the planetary gears 53 are pressed against and engaged with each other in the peripheral direction of the retainer 55, then the planetary gears 53 are prevented from rotating on their own axes and are prevented from moving any further in the arrow $X_1$ direction with respect to a main gear 51. Further, the retainer 55 is also prevented from rotating in the arrow $X^1$ direction with respect to the main gear 51. On the other hand, when the engaging projections 55b of the retainer 55 are moved in the arrow $X_2$ direction with respect to the main gear 51 and the planetary gears 53 are moved in the arrow $X_2$ direction with respect to the main gear 51 while rotating on their own axes clockwise in FIG. 17, since the engaging projections 55b of the retainer 55 are not engaged with the engaging projections 53a of the planetary gears 53, the planetary gears 53 are able to move in the arrow $X_2$ direction with respect to the main gear 51 while rotating on their own axes, and the retainer 55 is also able to rotate in the arrow $X_2$ direction with respect to the main gear 51.

Therefore, similar to the above-mentioned respective embodiments, after the webbing 29 is drawn out from the retractor by a proper amount, if the tongue plate and buckle of the seat belt device are connected to each other and the webbing 29 is taken up a small amount until the seat belt fits the occupants body, then the seat belt tensile force can be reduced.

Figure 18:
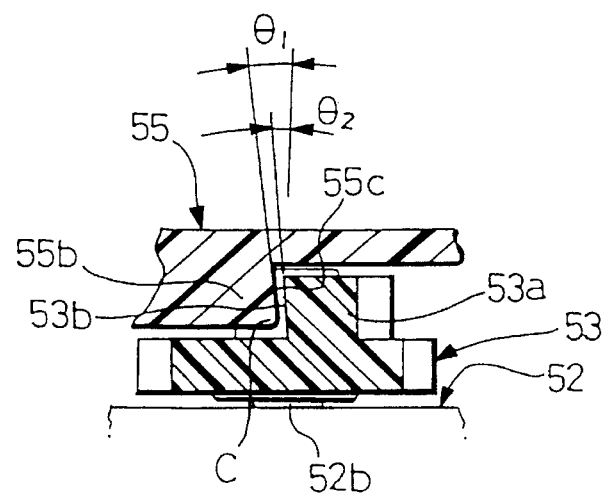
FIG. 18 is a schematic sectional view of the gear means, taken along the line XVIII—XVIII in FIG. 17.

Further, as shown in FIG. 18, the opposing surfaces 55c and side surfaces 53b are formed in such a manner that they are respectively inclined at an angle of $\theta_1$ and at an angle of $\theta_2$ with respect to the rotation axes of the planetary gears 53. Thus, the planetary gears 53 and retainer 55 are structured such that, when the engaging projections 53a of the planetary gears 53 are engaged with the engaging projections 55b of the retainer 55, the planetary gears 53 can move in the thrust direction (in FIG. 18, upwardly) and the engaging projections 53a of the planetary gears 53 and the engaging projections 55b of the retainer 55 can be thereby engaged with each other positively.

Here, the inclination angles $\theta_1$ and $\theta_2$ of the opposing surfaces 55c and side surfaces 53b are set in the range of 5°–10° so that, even if the planetary gears 53 move to a slight degree in the thrust direction, the meshing phases of the planetary gears 53 to the retainer 55 cannot be shifted due to the position relationship between the engaging projections 53a of the planetary gears 53 and the engaging projections 55b of the retainer 55. Also, if the inclination angle $\theta_1$ of the opposing surfaces 55c is set slightly larger than the inclination angle $\theta_2$ of the side surfaces 53b, then the leading end portions C of the engaging projections 55b of the retainer 55 on the planetary gears 53 side are abutted against the base portion side of the engaging projections 53a of the planetary gears 53, so that, the instant the engaging projections 53a of the planetary gears 53 are engaged with the engaging projections 55b of the retainer 55, a binding moment to be applied to the base portion of the support shaft 52b of the ratchet wheel 52 can be reduced. Therefore, the support shaft 52b can have a sufficient shock resisting strength without increasing the diameter thereof for enhancing the supporting rigidity thereof.

Figure 19A:
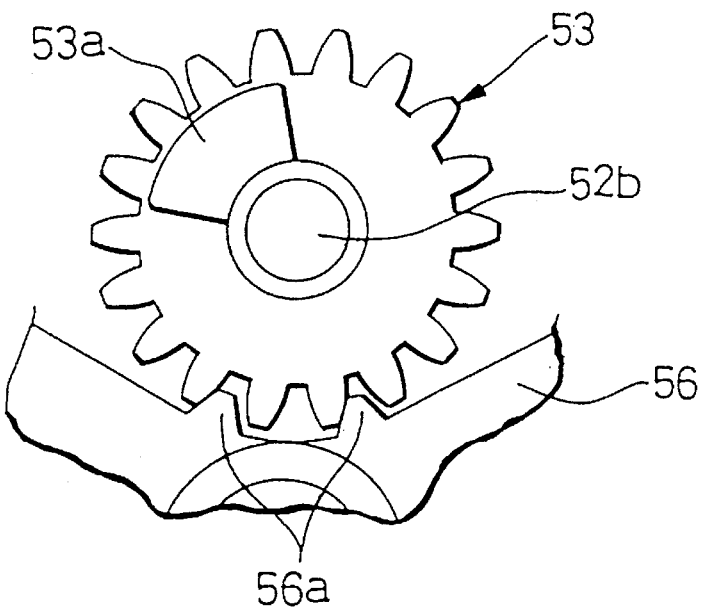
FIGS. 19(a) and 19(b) are enlarged views of the main portion of a planetary gear shown in FIG. 17, explaining the assembling procedure of the planetary gear.
Figure 19B:
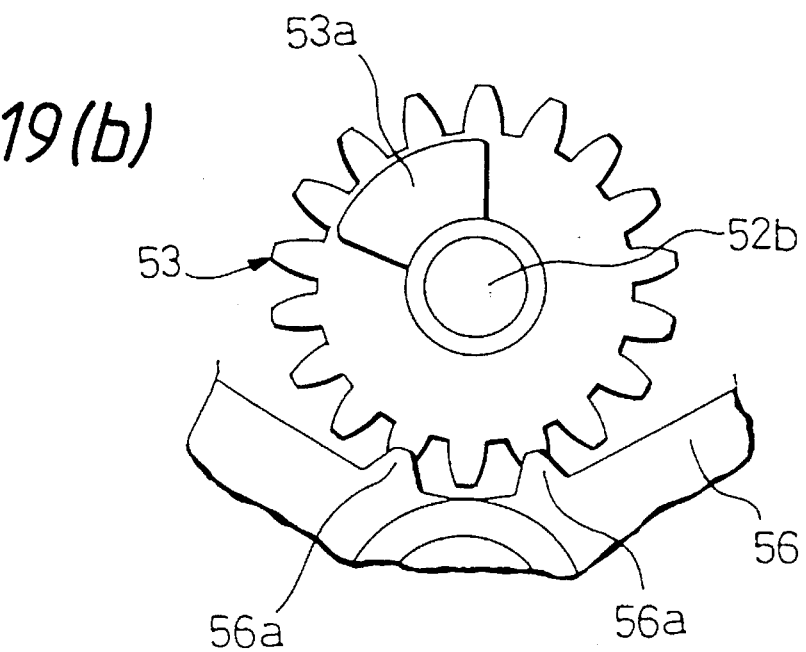

On the other hand, in order that the ratchet wheel 52 can be supported in a freely rotatable manner, in the support portion 56 of the ratchet wheel 52 including the axial hole 52c, securing projections 56a are provided which respectively project in the central direction of the planetary gears in such a manner that they are engageable with the respective planetary gears 53. In assembling the planetary gears 53 to the support shaft 52b of the ratchet wheel 52, the phases of the teeth of the planetary gears 53 may be set in such a direction as shown in FIG. 19(a) so that the teeth of the planetary gears 53 cannot interfere with the securing projections 56a. Further, in assembling the retainer 55 and ratchet wheel 52 together, the phases of the teeth of the planetary gears 53 may be set in such a direction as shown in FIG. 19(b) to thereby prevent the respective planetary gears 53 from slipping off the support shaft 52b.

Therefore, after the planetary gears 53 are assembled to the support shaft 52b of the ratchet wheel 52, the planetary gears 53 cannot be slipped off even when the ratchet wheel 52 is turned upside down in order to assemble the ratchet wheel 52 to the retainer 55, thereby simiplifying the assembling operation of the planetary gear device 50.

According to the invention, the structure of the winding force reducing device in the webbing wearing time is not limited to the above-described respective embodiments but, of course, other various structures can also be employed. For example, in the above respective embodiments, there is employed the switching means which detects electrically the condition of the webbing when the occupant wears the seat belt, uses the electromagnetic solenoid 21 to thereby mesh the lock arm 24 with the ratchet teeth 17a of the ratchet wheel 17 so as to switch over the retainer 15 of the planetary gear device 18 such that the retainer 15 can be rotated in the opposite direction with respect to the main gear 8. However, alternatively, the lock arm may be operated by use of mechanical means.

Also, of course, the gear means according to the invention is not limited to the structures of the planetary gear devices 18, 30, 40 and 50 employed in the above respective embodiments. Any other gear means can be employed, provided not only it is structured such that the winding shaft serving as a driven part is driven by two drive parts respectively connected to and energized by the first and second winding springs, but also it is switchable such that, in the seat belt storage time, the above two drive parts can be moved in the same direction and, when the seat belt is worn, the two drive parts can be moved in the opposite direction to each other. For example, other gear means can be used including a bevel gear and a pinion gear, or, a rack and a pinion gear.

According to the winding force reducing mechanism of the invention, during seat belt storage, since the energizing force of the second winding spring is applied in the same direction as the energizing force of the first winding spring to the winding shaft by the gear means, there can be applied to the winding shaft a sufficient energizing force in the webbing winding direction which includes the combined energizing force of the first and second winding springs. Also, when the seat belt is worn, since the second winding spring is energized in the elastic energy storing direction due to the energizing force of the first winding spring by the gear means, the stored elastic energy of the second winding spring cancels the energizing force of the first winding spring and the thus reduced energizing force in the webbing winding direction is applied to the winding shaft.

Accordingly, since the energizing forces of the first and second winding springs act effectively during either seat belt wearing or storing, the loads to be applied to the respective winding springs can be reduced and the stresses to be applied to the respective winding springs can also be reduced, which can reduce the sizes of the respective winding springs and can improve the durability thereof.

Also, by use of the gear means such as the planetary gear device or the like having a deceleration function, the rotation of the drive part connected to the second winding spring which acts to cancel the energizing force of the first winding spring in the seat belt wearing time is decelerated over the rotation of the drive part connected to the first winding spring, thereby being able to prevent the energizing force of the second winding spring from varying greatly according to the amount of winding of the webbing to be wound after the winding force reducing mechanism is put into operation.

Therefore, according to the invention, there can be provided a retractor for a seat belt including a winding force reducing mechanism which can reduces the sense of pressure of a webbing acting on an occupant when the occupant wears the seat belt and, after the occupant releases the seat belt, can apply a sufficient winding force to the webbing, in which the sizes of the winding springs can be reduced and the durability thereof can be improved.

What is claimed is:

1. A retractor for a seat belt including a winding force reducing mechanism for reducing a webbing winding force when an occupant wears the seat belt, said retractor comprising:

a base;

a winding shaft supported rotatably on said base for winding a webbing;

a first winding spring for energizing said winding shaft in a webbing winding direction;

a second winding spring disposed on said winding shaft in parallel with said first winding spring; and gear means interposed between said winding shaft and said second winding spring for applying the energizing force of said second winding spring to said winding shaft in the same direction as the energizing force of said first winding spring and for tightening said second winding spring in an elastic energy storing direction by means of the energizing force of said first winding spring;

wherein said gear means is structured such that, when the seat belt is worn by an occupant, the elastic energy of said second winding spring stored therein serves to cancel at least a portion of the energizing force of said first winding spring so that a reduced energizing force in said webbing winding direction is applied to said winding shaft.

2. A retractor for a seat belt as set forth in claim 1, further including a lower cover and an upper cover respectively fixed to said base for covering said gear means, wherein said gear means includes a sun gear fixed to said winding shaft and rotatable together with said winding shaft, a carrier member supported rotatably on a support shaft projectingly provided on an inner wall surface of said upper cover, a plurality of planetary gears respectively supported rotatably on a support shaft of said carrier member and meshable with said sun gear, and an internal gear supported rotatably on said support shaft of said upper cover and including internal teeth meshable with said planetary gears.

3. A retractor for a seat belt as set forth in claim 2, further comprising switching means which prevents rotation of said carrier member and switches said internal gear into its relative rotation in the opposite direction to said sun gear, wherein said carrier member includes ratchet teeth on an outer peripheral portion of said carrier member.

4. A retractor for a seat belt as set forth in claim 3, wherein said switching means includes an electromagnetic solenoid to be fixed to an interior of a holding portion of said lower cover, a lock arm which is supported on a support shaft provided on an outer surface of said lower cover and includes a leading end engaging portion meshable with said ratchet teeth of said carrier member, and a coil spring for energizing said lock arm in a direction in which said lock arm does not mesh with said ratchet teeth of said carrier member.

5. A retractor for a seat belt as set forth in claim 2, wherein said first winding spring has one end portion held in a securing groove formed in said sun gear, has the other end portion secured to a holding portion of said lower cover, and energizes said sun gear and said winding shaft in said webbing winding direction, and wherein said second winding spring has one end portion held in a securing groove formed in said internal gear, has the other end portion secured to a securing portion of said upper cover, and energizes said internal gear in said webbing winding direction.

6. A retractor for a seat belt as set forth in claim 2, further including stopper means for restricting the rotation of said planetary gears on their own axes and the relative movement of said planetary gears with respect to said internal gear.

7. A retractor for a seat belt as set forth in claim 6, wherein said stopper means includes a plurality of engaging projections respectively formed inwardly of said internal teeth of said internal gear and a plurality of engaging projections respectively provided on side surfaces of said planetary gears so as to be accommodated within a tip pitch circle of said planetary gears, and wherein said stopper means is arranged such that side surfaces of said engaging projections of said planetary gears and opposing surfaces of said engaging projections provided in said internal gear can be pressed against each other.

8. A retractor for a seat belt as set forth in claim 6, wherein said internal gear includes a plurality of flange portions, wherein said stopper means includes a plurality of engaging support portions respectively formed between said internal teeth and said flange portions of said internal gear, and a plurality of engaging projections respectively projecting outside of a tip pitch circle of said planetary gears and projecting on side surfaces of said planetary gears, and wherein said stopper means is arranged such that side surfaces of said engaging projections of said planetary gears and opposing surfaces of said engaging support portions of said internal gear can be pressed against each other.

9. A retractor for a seat belt as set forth in claim 2, wherein support portions of said carrier member include securing projections which are respectively engageable with said planetary gears and project toward central portions of said planetary gears.

10. A retractor for a seat belt as set forth in claim 7, wherein said opposing surfaces and said side surfaces are respectively formed to be inclinable at angles of 5° to 10° with respect to rotation axes of said planetary gears, while the angle of inclination of said opposing surfaces is set greater than that of said side surfaces.

11. A retractor for a seat belt including a winding force reducing mechanism for reducing a webbing winding force when an occupant wears the seat belt, said retractor comprising:

a base;

a winding shaft supported rotatably on said base for winding a webbing;

a first winding spring for energizing said winding shaft in a webbing winding direction;

a second winding spring disposed on said winding shaft in parallel with said first winding spring;

gear means interposed between said first and second winding springs; and, a lower cover and an upper cover respectively fixed to said base for covering said gear means;

wherein said gear means includes a sun gear fixed to said winding shaft and rotatable together with said winding shaft, a carrier member supported rotatably on a support shaft provided projectingly on an inner wall surface of said upper cover, a plurality of planetary gears respectively supported rotatably on support shafts of said carrier member and meshable with said sun gear, and an internal gear supported rotatably on said support shaft of said upper cover and including internal teeth meshable with said planetary gears; and wherein, when said seat belt is stored, an energizing force of said second winding spring is applied by said gear means to said winding shaft in the same direction as an energizing force of said first winding spring, while, when a seat belt is worn by an occupant, by means of said gear means, said second winding spring is tightened due to the energizing force of said first winding spring in an elastic energy storing direction, and the stored elastic energy of said second winding spring cancels at least a portion of the energizing force of said first winding spring, so that a reduced energizing force in said webbing winding direction is applied to said winding shaft.

12. A retractor for a seat belt as set forth in claim 11, further including stopper means for restricting rotation of said planetary gears on their own axes and relative movement of said planetary gears with respect to said internal gear.

13. A retractor for a seat belt as set forth in claim 12, wherein said stopper means includes a plurality of engaging projections formed inwardly of said internal teeth of said internal gear and a plurality of engaging projections respectively projecting on the side surfaces of said planetary gears so as to be accommodated within a tip pitch circle of said planetary gears, and said stopper means is arranged such that side surfaces of said engaging projections of said planetary gears and opposing surfaces of said engaging projections of said internal gear are selectively pressed against each other.

14. A retractor for a seat belt as set forth in claim 12, wherein said internal gear further includes a flange portion, wherein said stopper means includes a plurality of engaging support portions respectively formed between said internal teeth and flange portions of said internal gear and a plurality of engaging projections projecting outwardly of the tip pitch circle of said planetary gears and also projecting on the side surfaces of said planetary gears, and wherein said stopper means is arranged such that side surfaces of said engaging projections of said planetary gears and opposing surfaces of said engaging support portions of said internal gear are selectively pressed against each other.

15. A retractor for a seat belt as set forth in claim 11, wherein support portions of said carrier member includes a plurality of securing projections which respectively project toward central direction of said planetary gears and are engageable with said planetary gears.

16. A retractor for a seat belt as set forth in claim 13, wherein said opposing surfaces and said side surfaces are respectively so formed as to be inclinable at angles of 5° to 10° with respect to rotation axes of said planetary gears and the angle of inclination of said opposing surfaces is set greater than that of said side surfaces.

* * * * *